(12) United States Patent
Xue et al.

(10) Patent No.: US 10,306,638 B2
(45) Date of Patent: May 28, 2019

(54) DIRECT CURRENT COMPONENT SUBCARRIER CONFIGURATION METHOD AND APPARATUS

(71) Applicant: Huawei Technologies Co., Ltd., Shenzhen (CN)

(72) Inventors: Lixia Xue, Beijing (CN); Ye Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 15/588,184

(22) Filed: May 5, 2017

(65) Prior Publication Data

US 2017/0245278 A1    Aug. 24, 2017

Related U.S. Application Data

(63) Continuation of application No. PCT/CN2014/090645, filed on Nov. 7, 2014.

(51) Int. Cl.
| | | |
|---|---|---|
| *H04W 16/02* | (2009.01) | |
| *H04L 5/00* | (2006.01) | |
| *H04W 72/04* | (2009.01) | |
| *H04L 27/26* | (2006.01) | |
| *H04J 11/00* | (2006.01) | |
| *H04W 56/00* | (2009.01) | |

(52) U.S. Cl.
CPC ....... *H04W 72/0453* (2013.01); *H04J 11/005* (2013.01); *H04L 5/0053* (2013.01); *H04L 5/0073* (2013.01); *H04L 27/26* (2013.01); *H04L 27/2602* (2013.01); *H04W 16/02* (2013.01); *H04W 56/001* (2013.01); *H04W 72/042* (2013.01)

(58) Field of Classification Search
CPC .......... H04W 72/042; H04W 72/0453; H04W 56/001; H04L 5/0073
See application file for complete search history.

(56) References Cited

U.S. PATENT DOCUMENTS 10,200,872 B2 * 2/2019 Sakhnini ............... H04W 16/12
2009/0232234 A1   9/2009 Du
(Continued)

FOREIGN PATENT DOCUMENTS

| CN | 102244631 A | 11/2011 |
|---|---|---|
| CN | 102447662 A | 5/2012 |

(Continued)

*Primary Examiner* — Charles C Jiang
*Assistant Examiner* — Ryan C Kavleski
(74) *Attorney, Agent, or Firm* — Slater Matsil, LLP

(57) ABSTRACT

Embodiments of the present invention provide a direct current component subcarrier configuration method and apparatus. The base station includes: a processing module, configured to: determine a first DC subcarrier on a carrier, where the first DC subcarrier is located, in a frequency domain, at a non-center frequency location on the carrier, and a center frequency of the first DC subcarrier is an integer multiple of 100 KHz; and determine a second DC subcarrier on the carrier, where the second DC subcarrier is located, in the frequency domain, at a center frequency location at which the base station transmits the carrier, and the first DC subcarrier does not overlap the second DC subcarrier.

20 Claims, 9 Drawing Sheets

---

A base station determines a first DC subcarrier on a carrier, where the first DC subcarrier is located, in a frequency domain, at a non-center frequency location on the carrier, and a center frequency of the first DC subcarrier is an integer multiple of 100 KHz — S301

The base station determines a second DC subcarrier on the carrier, where the second DC subcarrier is located, in the frequency domain, at a center frequency location at which the base station transmits the carrier, and the first DC subcarrier does not overlap the second DC subcarrier — S302

(56) References Cited

U.S. PATENT DOCUMENTS

| | | | |
|---|---|---|---|
| 2011/0134861 A1 | 6/2011 | Seo et al. | |
| 2013/0070708 A1* | 3/2013 | Bai | H04L 5/0053 370/329 |
| 2015/0249980 A1* | 9/2015 | You | H04L 1/1861 370/329 |
| 2017/0238272 A1* | 8/2017 | You | H04J 11/0073 370/350 |

FOREIGN PATENT DOCUMENTS

| | | |
|---|---|---|
| CN | 102761911 A | 10/2012 |
| CN | 103517380 A | 1/2014 |
| EP | 2571218 A1 | 3/2013 |
| WO | 2013067386 A1 | 5/2013 |

* cited by examiner

DIRECT CURRENT COMPONENT SUBCARRIER CONFIGURATION METHOD AND APPARATUS

CROSS-REFERENCE TO RELATED APPLICATIONS

This application is a continuation of International Application No. PCT/CN2014/090645, filed on Nov. 7, 2014, the disclosure of which is hereby incorporated by reference in its entirety.

TECHNICAL FIELD

Embodiments of the present invention relate to the field of wireless communications technologies, and in particular, to a direct current component subcarrier configuration method and apparatus.

BACKGROUND

In a Long Term Evolution (LTE for short) system, an orthogonal frequency division multiplexing (OFDM for short) technology is used. In a system in which the OFDM technology is used, a direct current subcarrier (DC subcarrier for short) is located at a 0 Hz subcarrier location of a baseband signal.

According to different frequency bandwidths, carriers in the LTE system are corresponding to different transmission bandwidths. The transmission bandwidth is represented by using a quantity of physical resource blocks (PRB for short), one PRB includes 12 consecutive subcarriers in a frequency domain, and each subcarrier spacing is 15 KHz. One PRB includes six or seven consecutive OFDM symbols in a time domain. For a normal cyclic prefix (Normal CP for short), one PRB includes seven OFDM symbols; for an extended cyclic prefix (Extended CP for short), one PRB includes six OFDM symbols. A frequency-domain width of one PRB is 180 KHz, and a time length is 0.5 milliseconds (ms). A DC subcarrier is located at a center of an entire carrier frequency band of a carrier in the LTE system, and the DC subcarrier does not belong to any PRB of a transmission bandwidth.

For a device in the LTE system, there are two design manners: zero intermediate frequency and non-zero intermediate frequency. The zero intermediate frequency means that intermediate frequency modulation is not performed on an analog baseband signal, and a radio frequency signal is generated after one-time up conversion, or means that intermediate frequency conversion is not performed after a radio frequency signal is received, and an analog baseband signal is directly obtained by means of down conversion. The non-zero intermediate frequency means that at least one level of an intermediate frequency conversion process exists in a process in which up or down is performed between an analog baseband signal and a radio frequency signal. During up conversion or down conversion, a local-frequency signal is generated by a radio frequency oscillator, and may be leaked because the radio frequency oscillator has an extremely high frequency, that is, a high-frequency output signal of the radio frequency oscillator may be leaked or radiated to an input end of a device. After down-conversion demodulation is performed, the leaked signal generates an additional direct current component, and the additional direct current component interferes with frequency-domain information that is of a normal radio frequency signal and that is mapped on a DC subcarrier.

Generally, a receive end of a device that uses the zero intermediate frequency design is greatly interfered with by the direct current component of the local-frequency leakage. However, because an intermediate frequency conversion process needs to be performed for a device that uses the non-zero intermediate frequency design, an intermediate frequency circuit needs to be added; therefore, a receive end of the device that uses the non-zero intermediate frequency design is less interfered with by the direct current component of the local-frequency leakage. The direct current component of the local-frequency leakage causes little interference to both transmit ends of the device that uses the zero intermediate frequency design and the device that uses the non-zero intermediate frequency design. Generally, user equipment (UE for short) has a limited size and is sensitive to costs, and therefore, the UE generally uses the zero intermediate frequency design. A base station side device is less sensitive to a size and costs, and therefore, the base station side device generally uses the non-zero intermediate frequency design. That is, generally, a downlink DC subcarrier received by the UE is greatly interfered with.

In the LTE system, to resolve the problem that a downlink DC subcarrier may be interfered with, a DC subcarrier on a downlink carrier is vacated and not used, that is, the DC subcarrier is vacated and does not carry wanted data or a wanted signal. The DC subcarrier does not belong to any PRB of a carrier frequency band. On an uplink carrier, considering impact on a cubic metric (CM for short) or a peak-to-average power ratio (PAPR for short), a solution in which a vacated subcarrier is reserved is not used; instead, an entire frequency band is shifted by +/−7.5 KHz. In this way, no center of any carrier is right located on the DC subcarrier, and interference to data transmission on the uplink subcarrier is reduced.

In the LTE system, when accessing a base station, the UE first needs to detect information such as a primary synchronization signal (PSS for short), a secondary synchronization signal (SSS for short), and a physical broadcast channel (PBCH for short). A cycle of sending the PSS and the SSS is five subframes, and the PSS and the SSS occupy 72 subcarriers that are symmetric with respect to the DC subcarrier at the center of the frequency band. In the time domain, the PBCH occupies the first four symbols in the second time slot in a subframe 0, and in the frequency domain, the PBCH is also located on the 72 central subcarriers of the carrier frequency band. The PBCH carries a downlink carrier bandwidth. Before detecting the PBCH, the UE can identify only a downlink bandwidth having a frequency-domain width of 72 central subcarriers of a currently detected carrier, that is, all the PSS, the SSS, and the PBCH need to be placed within the downlink bandwidth having the frequency-domain width of the 72 central subcarriers of the carrier. The frequency-domain width corresponding to the 72 subcarriers that include the PSS, the SSS, and the PBCH may be referred to as an access bandwidth.

Because the access bandwidth is corresponding to the 72 subcarriers that use the DC subcarrier as a center, all UEs need to perform access at the center of the carrier. With evolution of the LTE system, in a scenario in which micro base stations are densely deployed, such an access manner causes more severe interference between common control channels such as PSSs, SSSs, and PBCHs of all cells, and the UE has higher difficulty in reading the foregoing common control channel or even cannot obtain the foregoing common control channel. Consequently, access of the UE is affected.

SUMMARY

Embodiments of the present invention provide a direct current component subcarrier configuration method and apparatus, so as to reduce interference between common control channels of cells.

A first aspect provides a base station, including: a processing module, configured to: determine a first DC subcarrier on a carrier, where the first DC subcarrier is located, in a frequency domain, at a non-center frequency location on the carrier, and a center frequency of the first DC subcarrier is an integer multiple of 100 KHz; and determine a second DC subcarrier on the carrier, where the second DC subcarrier is located, in the frequency domain, at a center frequency location at which the base station transmits the carrier, and the first DC subcarrier does not overlap the second DC subcarrier.

With reference to the first aspect, in a first possible implementation manner of the first aspect, a spacing between the first DC subcarrier and the second DC subcarrier in the frequency domain is an integer multiple of a frequency bandwidth of a subcarrier.

With reference to the first aspect or the first possible implementation manner of the first aspect, in a second possible implementation manner of the first aspect, the spacing between the first DC subcarrier and the second DC subcarrier in the frequency domain is a least common multiple of 100 KHz and an integer multiple of the frequency bandwidth of a subcarrier.

With reference to any one of the first aspect, or the first to the second possible implementation manners of the first aspect, in a third possible implementation manner of the first aspect, the spacing between the first DC subcarrier and the second DC subcarrier in the frequency domain is a least common multiple of an integer multiple of the frequency bandwidth of a subcarrier, 100 KHz, and a frequency bandwidth of one PRB.

With reference to any one of the first aspect, or the first to the third possible implementation manners of the first aspect, in a fourth possible implementation manner of the first aspect, the first DC subcarrier does not belong to any PRB on the carrier, and the second DC subcarrier belongs to a PRB on the carrier.

With reference to any one of the first aspect, or the first to the fourth possible implementation manners of the first aspect, in a fifth possible implementation manner of the first aspect, the first DC subcarrier is located on a central subcarrier of an access bandwidth of the carrier, the access bandwidth is used to send at least a synchronization channel and a PBCH, and the synchronization channel includes a PSS and an SSS.

With reference to any one of the first aspect, or the first to the fifth possible implementation manners of the first aspect, in a sixth possible implementation manner of the first aspect, the processing module is further configured to determine at least one third DC subcarrier on the carrier, where each third DC subcarrier is corresponding, in the frequency domain, to a center frequency location at which one user equipment UE receives the carrier.

With reference to the sixth possible implementation manner of the first aspect, in a seventh possible implementation manner of the first aspect, a center frequency of the third DC subcarrier is an integer multiple of 100 KHz.

With reference to the sixth or the seventh possible implementation manner of the first aspect, in an eighth possible implementation manner of the first aspect, if the third DC subcarrier overlaps the first DC subcarrier, the third DC subcarrier does not belong to any PRB on the carrier; or if the third DC subcarrier does not overlap the first DC subcarrier, the third DC subcarrier belongs to a PRB on the carrier.

With reference to any one of the sixth to the eighth possible implementation manners of the first aspect, in a ninth possible implementation manner of the first aspect, if the third DC subcarrier does not overlap the first DC subcarrier, a spacing between the first DC subcarrier and the third DC subcarrier in the frequency domain is a least common multiple of 100 KHz and an integer multiple of the frequency bandwidth of a subcarrier.

With reference to any one of the sixth to the ninth possible implementation manners of the first aspect, in a tenth possible implementation manner of the first aspect, if the third DC subcarrier does not overlap the first DC subcarrier, the spacing between the first DC subcarrier and the third DC subcarrier in the frequency domain is a least common multiple of an integer multiple of the frequency bandwidth of a subcarrier, 100 KHz, and the frequency bandwidth of one PRB.

With reference to any one of the sixth to the tenth possible implementation manners of the first aspect, in an eleventh possible implementation manner of the first aspect, if there are at least two third DC subcarriers, a spacing between any two of the third DC subcarriers in the frequency domain is a least common multiple of 100 KHz and an integer multiple of the frequency bandwidth of a subcarrier.

With reference to any one of the sixth to the eleventh possible implementation manners of the first aspect, in a twelfth possible implementation manner of the first aspect, if there are at least two third DC subcarriers, the spacing between any two of the third DC subcarriers in the frequency domain is a least common multiple of an integer multiple of the frequency bandwidth of a subcarrier, 100 KHz, and the frequency bandwidth of one PRB.

With reference to any one of the sixth to the twelfth possible implementation manners of the first aspect, in a thirteenth possible implementation manner of the first aspect, the base station further includes: a sending module, configured to: if the second DC subcarrier does not overlap the third DC subcarrier, transmit, on the second DC subcarrier, at least one of the following signals: a reference signal, a control channel, or a data signal.

With reference to the thirteenth possible implementation manner of the first aspect, in a fourteenth possible implementation manner of the first aspect, the sending module is further configured to send first signaling to UE, where the first signaling is used to explicitly or implicitly indicate location information of the first DC subcarrier.

With reference to the fourteenth possible implementation manner of the first aspect, in a fifteenth possible implementation manner of the first aspect, if the first signaling is explicit signaling, the first signaling is RRC dedicated signaling; or if the first signaling is implicit signaling, the first signaling is obtained by the UE by performing blind detection on a synchronization channel location.

With reference to any one of the thirteenth to the fifteenth possible implementation manners of the first aspect, in a sixteenth possible implementation manner of the first aspect, the sending module is further configured to send second signaling to the UE, where the second signaling includes location information of the second DC subcarrier and information about whether the second DC subcarrier carries a signal, and the second signaling is RRC dedicated signaling.

With reference to any one of the thirteenth to the sixteenth possible implementation manners of the first aspect, in a seventeenth possible implementation manner of the first aspect, the sending module is further configured to send third signaling to the UE, where the third signaling includes location information of the at least one third DC subcarrier and information about whether each third DC subcarrier carries a signal, and the third signaling is RRC dedicated signaling.

With reference to any one of the thirteenth to the seventeenth possible implementation manners of the first aspect, in an eighteenth possible implementation manner of the first aspect, the processing module is further configured to: determine a fourth DC subcarrier on the carrier, where the fourth DC subcarrier is corresponding, in the frequency domain, to a center frequency location on a carrier that is sent by the UE and that is received by the base station; and determine a fifth DC subcarrier on the carrier, where the fifth DC subcarrier is located, in the frequency domain, at a center frequency location at which the base station receives the carrier sent by the UE.

With reference to the eighteenth possible implementation manner of the first aspect, in a nineteenth possible implementation manner of the first aspect, the sending module is further configured to: send fourth signaling to the UE, where the fourth signaling includes location information of the fourth DC subcarrier and information about whether the fourth DC subcarrier carries a signal; and send fifth signaling to the UE, where the fifth signaling includes location information of the fifth DC subcarrier and information about whether the fifth DC subcarrier carries a signal.

A second aspect provides user equipment, including: a processing module, configured to: determine a first DC subcarrier on a carrier by using first signaling sent by a base station or by performing blind detection on a synchronization channel location, where the first DC subcarrier is located, in a frequency domain, at a non-center frequency location on the carrier, and a center frequency of the first DC subcarrier is an integer multiple of 100 KHz; and determine a second DC subcarrier on the carrier by using second signaling sent by the base station or by using a preset location relationship between the first DC subcarrier and the second DC subcarrier, where the second DC subcarrier is corresponding, in the frequency domain, to a center frequency location at which the base station sends the carrier, and the first DC subcarrier does not overlap the second DC subcarrier.

With reference to the second aspect, in a first possible implementation manner of the second aspect, the preset location relationship between the first DC subcarrier and the second DC subcarrier includes: a spacing between the first DC subcarrier and the second DC subcarrier in the frequency domain is an integer multiple of a frequency bandwidth of a subcarrier.

With reference to the second aspect or the first possible implementation manner of the second aspect, in a second possible implementation manner of the second aspect, the preset location relationship between the first DC subcarrier and the second DC subcarrier includes: the spacing between the first DC subcarrier and the second DC subcarrier in the frequency domain is a least common multiple of 100 KHz and an integer multiple of the frequency bandwidth of a subcarrier.

With reference to any one of the second aspect, or the first to the second possible implementation manners of the second aspect, in a third possible implementation manner of the second aspect, the spacing between the first DC subcarrier and the second DC subcarrier in the frequency domain is a least common multiple of an integer multiple of the frequency bandwidth of a subcarrier, 100 KHz, and a frequency bandwidth of one PRB.

With reference to any one of the second aspect, or the first to the third possible implementation manners of the second aspect, in a fourth possible implementation manner of the second aspect, the first DC subcarrier does not belong to any PRB on the carrier, and the second DC subcarrier belongs to a PRB on the carrier.

With reference to any one of the second aspect, or the first to the fourth possible implementation manners of the second aspect, in a fifth possible implementation manner of the second aspect, the first DC subcarrier is located on a central subcarrier of an access bandwidth of the carrier, the access bandwidth is used to send at least a synchronization channel and a PBCH, and the synchronization channel includes a PSS and an SSS.

With reference to any one of the second aspect, or the first to the fifth possible implementation manners of the second aspect, in a sixth possible implementation manner of the second aspect, the processing module is further configured to determine a third DC subcarrier on the carrier by using third signaling sent by the base station or by using a preset location relationship between the first DC subcarrier and the third DC subcarrier, where the third DC subcarrier is located, in the frequency domain, at a center frequency location at which the user equipment UE receives the carrier.

With reference to the sixth possible implementation manner of the second aspect, in a seventh possible implementation manner of the second aspect, a center frequency of the third DC subcarrier is an integer multiple of 100 KHz.

With reference to the sixth or the seventh possible implementation manner of the second aspect, in an eighth possible implementation manner of the second aspect, if the third DC subcarrier overlaps the first DC subcarrier, the third DC subcarrier does not belong to any PRB on the carrier; or if the third DC subcarrier does not overlap the first DC subcarrier, the third DC subcarrier belongs to a PRB on the carrier.

With reference to any one of the sixth to the eighth possible implementation manners of the second aspect, in a ninth possible implementation manner of the second aspect, if the third DC subcarrier does not overlap the first DC subcarrier, the preset location relationship between the first DC subcarrier and the third DC subcarrier includes: a spacing between the first DC subcarrier and the third DC subcarrier in the frequency domain is a least common multiple of 100 KHz and an integer multiple of the frequency bandwidth of a subcarrier.

With reference to any one of the sixth to the ninth possible implementation manners of the second aspect, in a tenth possible implementation manner of the second aspect, if the third DC subcarrier does not overlap the first DC subcarrier, the preset location relationship between the first DC sub-carrier and the third DC subcarrier includes: the spacing between the first DC subcarrier and the third DC subcarrier in the frequency domain is a least common multiple of an integer multiple of the frequency bandwidth of a subcarrier, 100 KHz, and the frequency bandwidth of one PRB.

With reference to any one of the sixth to the tenth possible implementation manners of the second aspect, in an eleventh possible implementation manner of the second aspect, the UE further includes: a receiving module, configured to: if the second DC subcarrier does not overlap the third DC subcarrier, receive, on the second DC subcarrier, at least one of the following signals: a reference signal, a control channel, or a data signal.

With reference to the eleventh possible implementation manner of the second aspect, in a twelfth possible implementation manner of the second aspect, the receiving module is further configured to: before the processing module determines the first DC subcarrier on the carrier, receive the first signaling sent by the base station, where the first signaling is used to explicitly or implicitly indicate location information of the first DC subcarrier.

With reference to the twelfth possible implementation manner of the second aspect, in a thirteenth possible implementation manner of the second aspect, if the first signaling is explicit signaling, the first signaling is RRC dedicated signaling; or if the first signaling is implicit signaling, the receiving module obtains the first signaling by performing blind detection on the synchronization channel location.

With reference to any one of the eleventh to the thirteenth possible implementation manners of the second aspect, in a fourteenth possible implementation manner of the second aspect, the receiving module is further configured to: before the processing module determines the second DC subcarrier on the carrier, receive the second signaling sent by the base station, where the second signaling includes location information of the second DC subcarrier and information about whether the second DC subcarrier carries a signal, and the second signaling is RRC dedicated signaling.

With reference to any one of the eleventh to the fourteenth possible implementation manners of the second aspect, in a fifteenth possible implementation manner of the second aspect, the receiving module is further configured to: before the processing module determines the third DC subcarrier on the carrier, receive the third signaling sent by the base station, where the third signaling includes location information of the at least one third DC subcarrier and information about whether each third DC subcarrier carries a signal, and the third signaling is RRC dedicated signaling.

With reference to any one of the second aspect, or the first to the fifteenth possible implementation manners of the second aspect, in a sixteenth possible implementation manner of the second aspect, the processing module is further configured to: determine a fourth DC subcarrier on the carrier by using fourth signaling sent by the base station, where the fourth DC subcarrier is located, in the frequency domain, at a center frequency location on a carrier sent by the UE; and determine a fifth DC subcarrier on the carrier by using fifth signaling sent by the base station, where the fifth DC subcarrier is corresponding, in the frequency domain, to a center frequency location at which the base station receives the carrier sent by the UE.

With reference to the sixteenth possible implementation manner of the second aspect, in a seventeenth possible implementation manner of the second aspect, the receiving module is further configured to: before the processing module determines the fourth DC subcarrier on the carrier, receive the fourth signaling sent by the base station, where the fourth signaling includes location information of the fourth DC subcarrier and information about whether the fourth DC subcarrier carries a signal; and before the processing module determines the fifth DC subcarrier on the carrier, receive the fifth signaling sent by the base station, where the fifth signaling includes location information of the fifth DC subcarrier and information about whether the fifth DC subcarrier carries a signal.

A third aspect provides a direct current component subcarrier configuration method. The method includes determining, by a base station, a first DC subcarrier on a carrier, where the first DC subcarrier is located, in a frequency domain, at a non-center frequency location on the carrier, and a center frequency of the first DC subcarrier is an integer multiple of 100 KHz. The method also includes determining, by the base station, a second DC subcarrier on the carrier, where the second DC subcarrier is located, in the frequency domain, at a center frequency location at which the base station transmits the carrier, and the first DC subcarrier does not overlap the second DC subcarrier.

With reference to the third aspect, in a first possible implementation manner of the third aspect, a spacing between the first DC subcarrier and the second DC subcarrier in the frequency domain is an integer multiple of a frequency bandwidth of a subcarrier.

With reference to the third aspect or the first possible implementation manner of the third aspect, in a second possible implementation manner of the third aspect, the spacing between the first DC subcarrier and the second DC subcarrier in the frequency domain is a least common multiple of 100 KHz and an integer multiple of the frequency bandwidth of a subcarrier.

With reference to any one of the third aspect, or the first to the second possible implementation manners of the third aspect, in a third possible implementation manner of the third aspect, the spacing between the first DC subcarrier and the second DC subcarrier in the frequency domain is a least common multiple of an integer multiple of the frequency bandwidth of a subcarrier, 100 KHz, and a frequency bandwidth of one PRB.

With reference to any one of the third aspect, or the first to the third possible implementation manners of the third aspect, in a fourth possible implementation manner of the third aspect, the first DC subcarrier does not belong to any PRB on the carrier, and the second DC subcarrier belongs to a PRB on the carrier.

With reference to any one of the third aspect, or the first to the fourth possible implementation manners of the third aspect, in a fifth possible implementation manner of the third aspect, the first DC subcarrier is located on a central subcarrier of an access bandwidth of the carrier, the access bandwidth is used to send at least a synchronization channel and a PBCH, and the synchronization channel includes a PSS and an SSS.

With reference to any one of the third aspect, or the first to the fifth possible implementation manners of the third aspect, in a sixth possible implementation manner of the third aspect, the method further includes: determining, by the base station, at least one third DC subcarrier on the carrier, where each third DC subcarrier is corresponding, in the frequency domain, to a center frequency location at which one user equipment UE receives the carrier.

With reference to the sixth possible implementation manner of the third aspect, in a seventh possible implementation manner of the third aspect, a center frequency of the third DC subcarrier is an integer multiple of 100 KHz.

With reference to the sixth or the seventh possible implementation manner of the third aspect, in an eighth possible implementation manner of the third aspect, if the third DC subcarrier overlaps the first DC subcarrier, the third DC subcarrier does not belong to any PRB on the carrier; or if the third DC subcarrier does not overlap the first DC subcarrier, the third DC subcarrier belongs to a PRB on the carrier.

With reference to any one of the sixth to the eighth possible implementation manners of the third aspect, in a ninth possible implementation manner of the third aspect, if the third DC subcarrier does not overlap the first DC subcarrier, a spacing between the first DC subcarrier and the third DC subcarrier in the frequency domain is a least common multiple of 100 KHz and an integer multiple of the frequency bandwidth of a subcarrier.

With reference to any one of the sixth to the ninth possible implementation manners of the third aspect, in a tenth possible implementation manner of the third aspect, if the third DC subcarrier does not overlap the first DC subcarrier, the spacing between the first DC subcarrier and the third DC subcarrier in the frequency domain is a least common multiple of an integer multiple of the frequency bandwidth of a subcarrier, 100 KHz, and the frequency bandwidth of one PRB.

With reference to any one of the sixth to the tenth possible implementation manners of the third aspect, in an eleventh possible implementation manner of the third aspect, if there are at least two third DC subcarriers, a spacing between any two of the third DC subcarriers in the frequency domain is a least common multiple of 100 KHz and an integer multiple of the frequency bandwidth of a subcarrier.

With reference to any one of the sixth to the eleventh possible implementation manners of the third aspect, in a twelfth possible implementation manner of the third aspect, the method further includes: if there are at least two third DC subcarriers, the spacing between any two of the third DC subcarriers in the frequency domain is a least common multiple of an integer multiple of the frequency bandwidth of a subcarrier, 100 KHz, and the frequency bandwidth of one PRB.

With reference to any one of the sixth to the twelfth possible implementation manners of the third aspect, in a thirteenth possible implementation manner of the third aspect, if the second DC subcarrier does not overlap the third DC subcarrier, the base station transmits, on the second DC subcarrier, at least one of the following signals: a reference signal, a control channel, or a data signal.

With reference to any one of the third aspect, or the first to the thirteenth possible implementation manners of the third aspect, in a fourteenth possible implementation manner of the third aspect, the method further includes: sending, by the base station, first signaling to UE, where the first signaling is used to explicitly or implicitly indicate location information of the first DC subcarrier.

With reference to the fourteenth possible implementation manner of the third aspect, in a fifteenth possible implementation manner of the third aspect, if the first signaling is explicit signaling, the first signaling is RRC dedicated signaling; or if the first signaling is implicit signaling, the first signaling is obtained by the UE by performing blind detection on a synchronization channel location.

With reference to any one of the third aspect, or the first to the fifteenth possible implementation manners of the third aspect, in a sixteenth possible implementation manner of the third aspect, the method further includes: sending, by the base station, second signaling to the UE, where the second signaling includes location information of the second DC subcarrier and information about whether the second DC subcarrier carries a signal, and the second signaling is RRC dedicated signaling.

With reference to any one of the third aspect, or the first to the sixteenth possible implementation manners of the third aspect, in a seventeenth possible implementation manner of the third aspect, the method further includes: sending, by the base station, third signaling to the UE, where the third signaling includes location information of the at least one third DC subcarrier and information about whether each third DC subcarrier carries a signal, and the third signaling is RRC dedicated signaling.

With reference to any one of the third aspect, or the first to the seventeenth possible implementation manners of the third aspect, in an eighteenth possible implementation manner of the third aspect, the method further includes: determining, by the base station, a fourth DC subcarrier on the carrier, where the fourth DC subcarrier is corresponding, in the frequency domain, to a center frequency location on a carrier that is sent by the UE and that is received by the base station; and determining, by the base station, a fifth DC subcarrier on the carrier, where the fifth DC subcarrier is located, in the frequency domain, at a center frequency location at which the base station receives the carrier sent by the UE.

With reference to the eighteenth possible implementation manner of the third aspect, in a nineteenth possible implementation manner of the third aspect, the method further includes: sending, by the base station, fourth signaling to the UE, where the fourth signaling includes location information of the fourth DC subcarrier and information about whether the fourth DC subcarrier carries a signal; and sending, by the base station, fifth signaling to the UE, where the fifth signaling includes location information of the fifth DC subcarrier and information about whether the fifth DC subcarrier carries a signal.

A fourth aspect provides a direct current component subcarrier configuration method. The method includes determining, by user equipment UE, a first DC subcarrier on a carrier by using first signaling sent by a base station or by performing blind detection on a synchronization channel location, where the first DC subcarrier is located, in a frequency domain, at a non-center frequency location on the carrier, and a center frequency of the first DC subcarrier is an integer multiple of 100 KHz. The method includes determining, by the UE, a second DC subcarrier on the carrier by using second signaling sent by the base station or by using a preset location relationship between the first DC subcarrier and the second DC subcarrier, where the second DC subcarrier is corresponding, in the frequency domain, to a center frequency location at which the base station sends the carrier, and the first DC subcarrier does not overlap the second DC subcarrier.

With reference to the fourth aspect, in a first possible implementation manner of the fourth aspect, the preset location relationship between the first DC subcarrier and the second DC subcarrier includes: a spacing between the first DC subcarrier and the second DC subcarrier in the frequency domain is an integer multiple of a frequency bandwidth of a subcarrier.

With reference to the fourth aspect or the first possible implementation manner of the fourth aspect, in a second possible implementation manner of the fourth aspect, the preset location relationship between the first DC subcarrier and the second DC subcarrier includes: the spacing between the first DC subcarrier and the second DC subcarrier in the frequency domain is a least common multiple of 100 KHz and an integer multiple of the frequency bandwidth of a subcarrier.

With reference to any one of the fourth aspect, or the first to the second possible implementation manners of the fourth aspect, in a third possible implementation manner of the fourth aspect, the spacing between the first DC subcarrier and the second DC subcarrier in the frequency domain is a least common multiple of an integer multiple of the frequency bandwidth of a subcarrier, 100 KHz, and a frequency bandwidth of one PRB.

With reference to any one of the fourth aspect, or the first to the third possible implementation manners of the fourth aspect, in a fourth possible implementation manner of the fourth aspect, the first DC subcarrier does not belong to any PRB on the carrier, and the second DC subcarrier belongs to a PRB on the carrier.

With reference to any one of the fourth aspect, or the first to the fourth possible implementation manners of the fourth aspect, in a fifth possible implementation manner of the fourth aspect, the first DC subcarrier is located on a central subcarrier of an access bandwidth of the carrier, the access bandwidth is used to send at least a synchronization channel and a PBCH, and the synchronization channel includes a PSS and an SSS.

With reference to any one of the fourth aspect, or the first to the fifth possible implementation manners of the fourth aspect, in a sixth possible implementation manner of the fourth aspect, the method further includes: determining, by the UE, a third DC subcarrier on the carrier by using third signaling sent by the base station or by using a preset location relationship between the first DC subcarrier and the third DC subcarrier, where the third DC subcarrier is located, in the frequency domain, at a center frequency location at which the UE receives the carrier.

With reference to the sixth possible implementation manner of the fourth aspect, in a seventh possible implementation manner of the fourth aspect, a center frequency of the third DC subcarrier is an integer multiple of 100 KHz.

With reference to the sixth or the seventh possible implementation manner of the fourth aspect, in an eighth possible implementation manner of the fourth aspect, if the third DC subcarrier overlaps the first DC subcarrier, the third DC subcarrier does not belong to any PRB on the carrier; or if the third DC subcarrier does not overlap the first DC subcarrier, the third DC subcarrier belongs to a PRB on the carrier.

With reference to any one of the sixth to the eighth possible implementation manners of the fourth aspect, in a ninth possible implementation manner of the fourth aspect, if the third DC subcarrier does not overlap the first DC subcarrier, the preset location relationship between the first DC subcarrier and the third DC subcarrier includes: a spacing between the first DC subcarrier and the third DC subcarrier in the frequency domain is a least common multiple of 100 KHz and an integer multiple of the frequency bandwidth of a subcarrier.

With reference to any one of the sixth to the ninth possible implementation manners of the fourth aspect, in a tenth possible implementation manner of the fourth aspect, if the third DC subcarrier does not overlap the first DC subcarrier, the preset location relationship between the first DC subcarrier and the third DC subcarrier includes: the spacing between the first DC subcarrier and the third DC subcarrier in the frequency domain is a least common multiple of an integer multiple of the frequency bandwidth of a subcarrier, 100 KHz, and the frequency bandwidth of one PRB.

With reference to any one of the sixth to the tenth possible implementation manners of the fourth aspect, in an eleventh possible implementation manner of the fourth aspect, if the second DC subcarrier does not overlap the third DC subcarrier, the UE receives, on the second DC subcarrier, at least one of the following signals: a reference signal, a control channel, or a data signal.

With reference to any one of the fourth aspect, or the first to the eleventh possible implementation manners of the fourth aspect, in a twelfth possible implementation manner of the fourth aspect, before the UE determines the first DC subcarrier on the carrier, the method further includes: receiving, by the UE, the first signaling sent by the base station, where the first signaling is used to explicitly or implicitly indicate location information of the first DC subcarrier.

With reference to the twelfth possible implementation manner of the fourth aspect, in a thirteenth possible implementation manner of the fourth aspect, if the first signaling is explicit signaling, the first signaling is RRC dedicated signaling; or if the first signaling is implicit signaling, the UE obtains the first signaling by performing blind detection on the synchronization channel location.

With reference to any one of the fourth aspect, or the first to the thirteenth possible implementation manners of the fourth aspect, in a fourteenth possible implementation manner of the fourth aspect, before the UE determines the second DC subcarrier on the carrier, the method further includes: receiving, by the UE, the second signaling sent by the base station, where the second signaling includes location information of the second DC subcarrier and information about whether the second DC subcarrier carries a signal, and the second signaling is RRC dedicated signaling.

With reference to any one of the fourth aspect, or the first to the fourteenth possible implementation manners of the fourth aspect, in a fifteenth possible implementation manner of the fourth aspect, before the UE determines the third DC subcarrier on the carrier, the method further includes: receiving, by the UE, the third signaling sent by the base station, where the third signaling includes location information of the at least one third DC subcarrier and information about whether each third DC subcarrier carries a signal, and the third signaling is RRC dedicated signaling.

With reference to any one of the fourth aspect, or the first to the fifteenth possible implementation manners of the fourth aspect, in a sixteenth possible implementation manner of the fourth aspect, the method further includes: determining, by the UE, a fourth DC subcarrier on the carrier by using fourth signaling sent by the base station, where the fourth DC subcarrier is located, in the frequency domain, at a center frequency location on a carrier sent by the UE; and determining, by the UE, a fifth DC subcarrier on the carrier by using fifth signaling sent by the base station, where the fifth DC subcarrier is corresponding, in the frequency domain, to a center frequency location at which the base station receives the carrier sent by the UE.

With reference to the sixteenth possible implementation manner of the fourth aspect, in a seventeenth possible implementation manner of the fourth aspect, before the UE determines the fourth DC subcarrier on the carrier, the method further includes: receiving, by the UE, the fourth signaling sent by the base station, where the fourth signaling includes location information of the fourth DC subcarrier and information about whether the fourth DC subcarrier carries a signal; and before the UE determines the fifth DC subcarrier on the carrier, the method further includes: receiving, by the UE, the fifth signaling sent by the base station, where the fifth signaling includes location information of the fifth DC subcarrier and information about whether the fifth DC subcarrier carries a signal.

According to the direct current component subcarrier configuration method and apparatus that are provided in the embodiments of the present invention, a first DC subcarrier and a second DC subcarrier are determined, where the first DC subcarrier is located, in a frequency domain, at a non-center frequency location on a carrier, a center frequency of the first DC subcarrier is an integer multiple of 100 KHz, the second DC subcarrier is located, in the frequency domain, at a center frequency location at which a base station transmits the carrier, so that the base station can provide, to UE, two candidate locations for accessing. The base station may select a location according to interference statuses detected at the different locations, or may randomly select a location, so that different base stations can send common control channels such as PSSs, SSSs, and PBCHs at the two different locations, thereby reducing a collision between transmission locations of common control channels of all cells, and reducing interference between the common control channels of all the cells.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
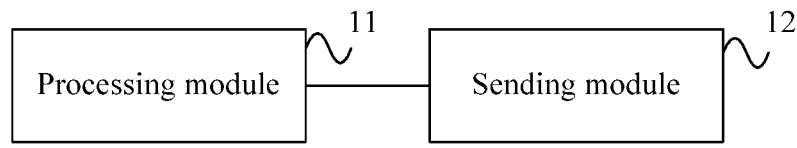
FIG. 1 is a schematic structural diagram of a base station according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In LTE systems of releases R8 to R12, each LTE carrier is backward compatible, that is, an LTE system of each later release can always support access of LTE UE in an earlier release and provide a service. On an LTE carrier in each later release, the following needs to be sent: a PSS and an SSS, a PBCH, a system information block (SIB), a physical downlink control channel (PDCCH), cell-specific reference signals (CRS) on all frequency bands and in all subframes, and the like that have same resource locations and same sending manners as those in an LTE system of release 8. Specifically, a cycle of sending the PSS and the SSS is five subframes. In a frequency domain, the PSS and the SSS occupy 72 subcarriers that are symmetric with respect to a DC subcarrier at the center of a frequency band, and in a time domain, the PSS and the SSS occupy two symbols, and there is a pre-defined relationship between locations of the symbols. In addition, a center frequency of a carrier is located at a grid of 100 KHz, that is, the center frequency of the carrier needs to be an integer multiple of 100 KHz.

A PBCH sending manner is as follows: In the time domain, the PBCH occupies the first four symbols in the second timeslot in a subframe 0, and in the frequency domain, the PBCH is also located within a frequency-domain width of the 72 central subcarriers of the carrier. The PBCH carries a downlink carrier bandwidth. Therefore, before the PBCH is detected, only a downlink bandwidth having a frequency-domain width of resource blocks of 72 central subcarriers of a currently detected carrier can be identified, that is, both a synchronization signal and the PBCH need to be placed within the downlink bandwidth having the frequency-domain width of the resource blocks of the 72 central subcarriers of the carrier. The frequency-domain width corresponding to the 72 subcarriers that include the synchronization signal and are related to the PBCH may be referred to as an access bandwidth. The SIB may further fall into an SIB 1 to an SIB 13. A cycle of sending the SIB 1 is 20 ms. In terms of time, the SIB 1 is located in a subframe 5 of an even-numbered radio frame, and a frequency resource of the SIB 1 is scheduled based on a PDCCH. The PDCCH is located in common search space, that is, search space that all UEs need to detect. A sending time of another SIB is configured by using the SIB 1, and a frequency resource of the another SIB is also scheduled based on a PDCCH. The PDCCH is located in a control area. In the time domain, the control area is located on the first n symbols of a subframe, and n is one of natural numbers 1 to 4; and the control area occupies an entire carrier bandwidth in the frequency domain. A PDCCH sent in the control area is scattered, by means of interleaving, on the entire bandwidth, so as to obtain a frequency diversity gain.

A procedure in which UE accesses an LTE system is as follows: First, the UE detects a PSS, and then, detects an SSS according to a time-domain location relationship between the PSS and the SSS, so as to implement initial time-frequency synchronization, which includes symbol synchronization, subframe synchronization, and frame synchronization. In addition, the UE may obtain a physical cell identifier by using a sequence combination of the detected PSS and SSS, determine a cyclic prefix length by using a time interval between the PSS and the SSS, and the like. Next, the UE may determine a CRS to measure the cell. If a measurement result is relatively good, the UE may continue to read system information, that is, reads a PBCH first, to obtain a downlink system bandwidth, an antenna port of the CRS, a system frame number, physical hybrid automatic repeat request indicator channel (PHICH) configuration information, and the like; and reads an SIB 1 next, and then, reads another SIB according to a configuration of the SIB 1, for example, reads an SIB2, to obtain random access configuration information and the like. Based on the foregoing, if a service needs to be transmitted, the UE may send the random access configuration information to establish a radio link connection to a base station, and then, may perform normal data transmission.

Table 1 is a table of a correspondence between a frequency bandwidth and a transmission bandwidth in the LTE systems of releases R8 to R12. A unit of the frequency bandwidth is MHz, and a unit of the transmission bandwidth is a quantity of PRBs. It can be learned from Table 1 that the LTE systems of releases R8 to R12 support a maximum of a 20 MHz frequency bandwidth, which is corresponding to 100 PRBs.

TABLE 1

| | Frequency bandwidth | | | | | |
|---|---|---|---|---|---|---|
| | 1.4 | 3 | 5 | 10 | 15 | 20 |
| Quantity of resource blocks | 6 | 15 | 25 | 50 | 75 | 100 |

In a current LTE system, a receive bandwidth capability of UE is higher than or equal to a transmit bandwidth capability of a network. For example, the UE has a 20 MHz receive capability, and a transmit capability of the network may be 20 MHz, or may be 10 MHz. In this case, once the UE obtains an entire carrier bandwidth from a PBCH at the center of a carrier, the UE may access a signal on the entire bandwidth, so that a final receive/transmit bandwidth of the UE is the same as a transmit/receive bandwidth of a base station. However, with evolution of the LTE system, a future LTE system may support a bandwidth that is at least higher than 20 MHz, and correspondingly, multiple UE capabilities need to be supported, for example, access bandwidth capabilities of some low-level UEs or earlier-release UEs, for example, a bandwidth capability of a radio frequency and/or a baseband is limited, that is, lower than a transmission bandwidth of the network. These low-level UEs may be, for example, machine UEs. In addition, because the earlier-release UE supports a maximum of a 20 MHz bandwidth, compatibility of communication of the earlier-release UE needs to be considered. In addition, capabilities of network bandwidths are different from each other, for example, there are some non-standard bandwidths. However, considering aspects such as radio frequency implementation, it is not expected that excessive complex implementation is introduced into the UE to support more other non-standard bandwidths than six standard bandwidths in Table 1. Therefore, in terms of design, it is expected that during data transmission in the network by using various bandwidths, the UE may still support data communication with the network by using a relatively low standard bandwidth or a standard-bandwidth combination. For example, when a system bandwidth is 6 MHz, the UE may perform access by using a 5 MHz standard bandwidth (a specific selected standard bandwidth may be any standard bandwidth lower than a non-standard system bandwidth, and generally, a maximum standard bandwidth lower than the non-standard system bandwidth may be selected, so that the UE may use as many system resources as possible, and obtain a relatively high throughput), and establish communication with the network. In this way, a receive capability requirement of the UE whose receive bandwidth is lower than a transmit bandwidth of the network needs to be supported, or a transmit capability requirement of the UE whose transmit bandwidth is lower than a receive bandwidth of the network needs to be supported. In addition, the UE may support the non-standard bandwidth by combining and splicing standard bandwidths. For example, when a system bandwidth is 6 MHz, the UE may support the system bandwidth by combining and splicing two 5 MHz standard bandwidths. Although there is an overlap between the two 5 MHz carriers, the UE may obtain a throughput and a peak rate of the entire system bandwidth.

In this way, when access is performed by using a standard bandwidth to use some system bandwidth resources, one possible design solution is as follows: A location at which the UE performs initial access may be a non-central location on a carrier. Further, one carrier may support initial access at multiple locations, so that the carrier may be flexibly used and configured. However, current UE can perform access only on 72 subcarriers that use a DC subcarrier as a center. Therefore, to implement the foregoing design solution, how to configure a DC subcarrier on one carrier is a problem to be resolved. In this way, UE with different capabilities can perform access at different locations (which include a non-central location on a carrier) and use different carrier bandwidths, so as to flexibly transmit reference information, a control channel, and data on the carrier. In addition, access and carrier use can be implemented for earlier-release LTE UE, and normal communication with the base station is kept, and backward compatibility is implemented. Moreover, the following needs to be considered: how to implement DC subcarrier configuration, so that no interference is caused to or less impact is imposed on data transmission of new-release UE and earlier-release UE.

An embodiment of the present invention provides a base station, configured to resolve the foregoing problem. The base station provided in this embodiment of the present invention includes: a processing module, configured to: determine a first DC subcarrier on a carrier, where the first DC subcarrier is located, in a frequency domain, at a non-center frequency location on the carrier, and a center frequency of the first DC subcarrier is an integer multiple of 100 KHz; and determine a second DC subcarrier on the carrier, where the second DC subcarrier is located, in the frequency domain, at a center frequency location at which the base station transmits the carrier, and the first DC subcarrier does not overlap the second DC subcarrier.

Specifically, to resolve various problems that are brought by a case in which all UEs in a current LTE system need to perform access on 72 subcarriers that use a DC subcarrier at the center of a carrier as a center, according to the base station in this embodiment, the processing module determines two DC subcarriers on the carrier, which are separately the first DC subcarrier and the second DC subcarrier. There is no sequence in which the processing module determines the two DC subcarriers. Generally, the processing module simultaneously determines the two DC subcarriers.

The first DC subcarrier is located, in the frequency domain, at the non-center frequency location on the carrier, and the center frequency of the first DC subcarrier is an integer multiple of 100 KHz. The second DC subcarrier is located, in the frequency domain, at the center frequency location at which the base station transmits the carrier.

In LTE systems of existing releases R8 to R12, DC subcarrier is located at a center frequency location on a carrier. In this way, all UEs need to perform access at the center frequency location on a carrier, thereby causing the foregoing problems. However, in this embodiment, the processing module of the base station separately determines the first DC subcarrier and the second DC subcarrier, the first DC subcarrier is located, in the frequency domain, at the non-center frequency location on the carrier, and the second DC subcarrier is located, in the frequency domain, at the center frequency location at which the base station transmits the carrier, that is, the processing module determines two DC subcarriers on the carrier. In this way, the base station may choose to send a common control channel such as a PSS, an SSS, and a PBCH on 72 subcarriers that use the first DC subcarrier as a center, or may still send a common control channel such as a PSS, an SSS, and a PBCH on 72 subcarriers that use the second DC subcarrier as a center. That is, the 72 subcarriers that use the first DC subcarrier as a center are used as an access bandwidth, or the 72 subcarriers that use the second DC subcarrier as a center are used as an access bandwidth. The center frequency of the first DC subcarrier is an integer multiple of 100 KHz. This is because a UE scanning granularity specified in the LTE system is 100 KHz, that is, the UE scans an access bandwidth at a grid of 100 KHz. Therefore, the center frequency of the first DC subcarrier needs to be an integer multiple of 100 KHz, so as to support access of UE in existing releases R8 to R12. Backward compatibility design is also kept, so that new-release UE can implement access without changing an implementation algorithm for carrier scanning. The second DC subcarrier is located, in the frequency domain, at the center frequency location at which the base station transmits the carrier, that is, the second DC subcarrier is located at a 0 Hz subcarrier location of a baseband signal corresponding to the transmit carrier of the base station. The center frequency location at which the base station transmits the carrier depends on implementation of the base station, and may not be an integer multiple of 100 KHz, that is, a location of the second DC subcarrier in the frequency domain may not be at a grid of 100 KHz. However, if the second DC subcarrier supports access of the UE, especially the UE in existing releases R8 to R12, and a method (that is, a common control channel such as a PSS, an SSS, and a PBCH is sent on 72 subcarriers that use a DC subcarrier as a center, so as to implement the access of the UE) in the LTE systems of existing releases R8 to R12 is used as an access method, the location of the second DC subcarrier in the frequency domain needs to be at a grid of 100 KHz.

According to the base station provided in this embodiment, a first DC subcarrier and a second DC subcarrier are determined, where the first DC subcarrier is located, in a frequency domain, at a non-center frequency location on a carrier, a center frequency of the first DC subcarrier is an integer multiple of 100 KHz, the second DC subcarrier is located, in the frequency domain, at a center frequency location at which the base station transmits the carrier, so that the base station can provide, to UE, two candidate locations for accessing. The base station may select a location according to interference statuses detected at the different locations, or may randomly select a location, so that different base stations can send common control channels such as PSSs, SSSs, and PBCHs at the two different locations, thereby reducing a collision between transmission locations of common control channels of all cells, and reducing interference between the common control channels of all the cells.

Another method is as follows: By means of pre-defining or signaling notification, there may be potentially more than one candidate location of the first DC subcarrier on one carrier. The base station may select a location of the first DC subcarrier according to interference statuses detected at the different locations, or the base station may randomly select a location of the first DC subcarrier, so as to perform signal transmission. By using the method in which there is more than one candidate location of the first DC subcarrier, a collision between transmission locations of common control channels of all cells is reduced, and interference between the common control channels of all the cells is reduced. Certainly, there may also be more than one configuration of the first DC subcarrier on one carrier. In this way, the base station can provide, on this carrier, more than one location for accessing, thereby reducing a collision and interference between the common control channels of all the cells.

Further, according to the foregoing base station provided in this embodiment of the present invention, a spacing between the first DC subcarrier and the second DC subcarrier in the frequency domain is an integer multiple of a frequency bandwidth of a subcarrier, so as to ensure orthogonality between the first DC subcarrier and the second DC subcarrier on a carrier. In another aspect, for different cells, for example, a first cell sends a common control channel by using the first DC subcarrier as a center, and a second base station sends a common control channel by using the second DC subcarrier as a center; if the spacing between the first DC subcarrier and the second DC subcarrier in the frequency domain is an integer multiple of the frequency bandwidth of a subcarrier, each subcarrier in a cell served by the first base station can be aligned with each subcarrier in a cell served by the second base station, thereby facilitating coordination of interference between the two cells. Generally, a frequency bandwidth of one subcarrier in the LTE system is 15 KHz, that is, the spacing between the first DC subcarrier and the second DC subcarrier in the frequency domain is an integer multiple of 15 KHz.

Further, according to the foregoing base station provided in this embodiment of the present invention, the spacing between the first DC subcarrier and the second DC subcarrier in the frequency domain is a least common multiple of 100 KHz and an integer multiple of the frequency bandwidth of a subcarrier. Because a UE scanning granularity in the LTE system is 100 KHz, when the second DC subcarrier is also configured at a grid of 100 KHz to support access of the UE, the spacing between the first DC subcarrier and the second DC subcarrier further needs to be an integer multiple of 100 KHz. With reference to that the spacing between the first DC subcarrier and the second DC subcarrier is an integer multiple of the frequency bandwidth of a subcarrier, the spacing between the first DC subcarrier and the second DC subcarrier in the frequency domain is a least common multiple of 100 KHz and an integer multiple of the frequency bandwidth of a subcarrier. Because a frequency bandwidth of one subcarrier in the current LTE system is 15 KHz, and a least common multiple of 15 KHz and 100 KHz is 300 KHz, the spacing between the first DC subcarrier and the second DC subcarrier needs to be an integer multiple of 300 KHz.

Further, according to the foregoing base station provided in this embodiment of the present invention, the spacing between the first DC subcarrier and the second DC subcarrier in the frequency domain is a least common multiple of an integer multiple of the frequency bandwidth of a subcarrier, 100 KHz, and a frequency bandwidth of one PRB. In the LTE system, one PRB includes 12 consecutive subcarriers (one PRB includes 12 consecutive available subcarriers in the frequency domain other than a vacated DC subcarrier) in the frequency domain; therefore, a frequency bandwidth of one PRB is 180 KHz. When determining the first DC subcarrier and the second DC subcarrier on the carrier, the base station determines to send a common control channel such as a PSS, an SSS, and a PBCH by using the first DC subcarrier as a center, so that the UE performs access on the 72 subcarriers that use the first DC subcarrier as a center. In this way, the UE further determines, according to a system bandwidth indicated by the PBCH, sorting and locations of PRBs corresponding to the foregoing 72 subcarriers. When the first DC subcarrier and the second DC subcarrier may support access, and different UEs may perform access on different DC subcarriers, to ensure that PRBs included on the carrier may be centrally sorted and numbered and that the base station performs overall PRB scheduling, an integer quantity of PRBs need to exist between the first DC subcarrier and the second DC subcarrier, so that PRBs observed by different UEs are as aligned as possible, thereby avoiding interleaving and overlapping between PRB resources observed by different UEs, and also facilitating coordination of interference between two cells by using a PRB granularity. In this case, the spacing between the first DC subcarrier and the second DC subcarrier in the frequency domain further needs to be an integer multiple of the frequency bandwidth of one PRB. With reference to the foregoing aspects, the spacing between the first DC subcarrier and the second DC subcarrier in the frequency domain is a least common multiple of an integer multiple of the frequency bandwidth of a subcarrier, 100 KHz, and the frequency bandwidth of one PRB. Generally, in the LTE system, the frequency bandwidth of one subcarrier is 15 KHz, the frequency bandwidth of one PRB is 180 KHz, and a least common multiple of 15 KHz, 100 KHz, and 180 KHz is 900 KHz, that is, the spacing between the first DC subcarrier and the second DC subcarrier in the frequency domain is an integer multiple of 900 KHz.

Further, according to the foregoing base station provided in this embodiment of the present invention, the first DC subcarrier does not belong to any PRB on the carrier, and the second DC subcarrier belongs to a PRB on the carrier. In the LTE systems of existing releases R8 to R12, a DC subcarrier is located at a center frequency location on a carrier, and the DC subcarrier does not belong to any PRB, that is, on an entire carrier, there is an independent subcarrier that does not belong to any PRB. To be compatible with the LTE systems of releases R8 to R12, according to the foregoing base station provided in this embodiment of the present invention, the first DC subcarrier does not belong to any PRB on the carrier, and the second DC subcarrier belongs to a PRB on the carrier. In this way, it can be ensured that with a same bandwidth, a quantity of subcarriers on the carrier and a quantity of PRBs on the carrier are the same as those in the LTE systems of releases R8 to R12, and a guard bandwidth on either side of the carrier is the same as that with the same bandwidth in the LTE systems of releases R8 to R12. Therefore, a system compatibility requirement can be met; in addition, requirements of a design parameter and indicator in the original LTE system are further maintained, current implementation algorithms of the base station and the UE are reused, and neither additional implementation complexity is introduced nor additional standardization impact is imposed.

It should be noted that, in the LTE systems of releases R8 to R12, a DC subcarrier is located at a center frequency location on a carrier, and the DC subcarrier does not belong to any PRB. According to the foregoing base station provided in this embodiment of the present invention, the first DC subcarrier is not at a central location on the carrier, and the first DC subcarrier does not belong to any PRB. The second DC subcarrier is at the central location on the carrier, and the second DC subcarrier belongs to a PRB. In this way, if the spacing between the first DC subcarrier and the second DC subcarrier in the frequency domain is an integer multiple of 900 KHz, not all PRBs of the carrier can be aligned, and PRBs on which subcarriers between the first DC subcarrier and the second DC subcarrier are located cannot be aligned. Generally, there is one subcarrier difference. However, boundaries of other PRBs than the PRBs corresponding to the subcarriers between the first DC subcarrier and the second DC subcarrier are aligned. In this way, it can be ensured that PRBs on the carrier can be as aligned as possible, thereby facilitating data scheduling and cell interference coordination of the base station.

Further, according to the foregoing base station provided in this embodiment of the present invention, the first DC subcarrier is located on a central subcarrier of an access bandwidth of the carrier, the access bandwidth is used to send at least a synchronization channel and a PBCH, and the synchronization channel includes a PSS and an SSS. The first DC subcarrier determined by the processing module of the foregoing base station provided in this embodiment of the present invention is located on the central subcarrier of the access bandwidth of the carrier, the access bandwidth is used to send at least a synchronization channel and a PBCH, and the synchronization channel includes a PSS and an SSS. In the LTE systems of existing releases R8 to R12, the access bandwidth is located at a center frequency location on a carrier, that is, the UE can perform access only at the center frequency location on the carrier. The first DC subcarrier is used as a center of the access bandwidth of the carrier, so that the UE can perform access at the non-center frequency location on the carrier, thereby avoiding interference caused because common control channels such as PSSs, SSSs, and PBCHs of multiple cells are all located at a central location on the carrier.

Further, according to the foregoing base station provided in this embodiment of the present invention, the processing module is further configured to determine at least one third DC subcarrier on the carrier, and each third DC subcarrier is corresponding, in the frequency domain, to a center frequency location at which one user equipment UE receives the carrier.

Specifically, from the perspective of UE that accesses the base station, the third DC subcarrier is located at a 0 Hz subcarrier location of a baseband signal corresponding to a receive carrier of the UE. Each UE that accesses the base station is corresponding to one third DC subcarrier, and third DC subcarriers corresponding to different types of UEs or UEs having different capabilities may have different locations in the frequency domain. From the perspective of the base station, each third DC subcarrier is corresponding, in the frequency domain, to a center frequency location at which one UE receives the carrier.

Different UEs may have different receive carrier bandwidths. Specifically, a receive carrier of UE may be an entire transmit carrier of the base station, and in this case, a transmit carrier bandwidth of the base station is equal to a receive carrier bandwidth of the UE; or a receive carrier of UE may be a part of a transmit carrier bandwidth of the base station, and in this case, the transmit carrier bandwidth of the base station is not equal to a receive carrier bandwidth of the UE. Generally, the transmit carrier bandwidth of the base station is higher than the receive carrier bandwidth of the UE. In this way, receive carrier bandwidths of different types of UEs or UEs having different capabilities may be different, and third DC subcarriers of the UEs may have different locations on the carrier. Therefore, from the perspective of the base station, there is more than one third DC subcarrier on the carrier, and these third DC subcarriers may be located at different frequency-domain locations.

Likewise, considering that the UE scanning granularity designed in the LTE system is 100 KHz, to reduce impact on UE implementation, a center frequency of the third DC subcarrier is an integer multiple of 100 KHz.

Further, from the perspective of the UE, the third DC subcarrier is located at the 0 Hz subcarrier location of the baseband signal corresponding to the receive carrier of the UE, that is, the center frequency location at which the UE receives the carrier. Therefore, from the perspective of the base station, the third DC subcarrier may overlap the first DC subcarrier or the second DC subcarrier. To ensure that all PRBs of the transmit carrier of the base station are aligned with all PRBs of the receive carrier of the UE, if the third DC subcarrier overlaps the first DC subcarrier, the third DC subcarrier does not belong to any PRB on the carrier; or if the third DC subcarrier does not overlap the first DC subcarrier, the third DC subcarrier belongs to a PRB on the carrier.

Likewise, because both subcarrier alignment and the UE scanning granularity need to be considered, if the third DC subcarrier does not overlap the first DC subcarrier, a spacing between the first DC subcarrier and the third DC subcarrier in the frequency domain is a least common multiple of 100 KHz and an integer multiple of the frequency bandwidth of a subcarrier. Generally, a frequency bandwidth of one subcarrier in the LTE system is 15 KHz. Therefore, if the third DC subcarrier does not overlap the first DC subcarrier, the spacing between the first DC subcarrier and the third DC subcarrier in the frequency domain is an integer multiple of 300 KHz.

In addition, because all the subcarrier alignment, the UE scanning granularity, and PRB alignment need to be considered, if the third DC subcarrier does not overlap the first DC subcarrier, the spacing between the first DC subcarrier and the third DC subcarrier in the frequency domain is a least common multiple of an integer multiple of the frequency bandwidth of a subcarrier, 100 KHz, and the frequency bandwidth of one PRB. Generally, in the LTE system, a frequency bandwidth of one subcarrier is 15 KHz, and a frequency bandwidth of one PRB is 180 KHz. Therefore, if the third DC subcarrier does not overlap the first DC subcarrier, the spacing between the first DC subcarrier and the third DC subcarrier in the frequency domain is an integer multiple of 900 KHz.

Further, if there are at least two third DC subcarriers, because a third DC subcarrier corresponding to any UE needs to meet a grid of 100 KHz, a spacing between any two of the third DC subcarriers in the frequency domain is a least common multiple of 100 KHz and an integer multiple of the frequency bandwidth of a subcarrier. Generally, a frequency bandwidth of one subcarrier in the LTE system is 15 KHz. Therefore, if there are at least two third DC subcarriers, the spacing between any two of the third DC subcarriers in the frequency domain is an integer multiple of 300 KHz.

Further, if there are at least two third DC subcarriers, because two third DC subcarriers are spaced by an integer quantity of PRB granularities, the spacing between any two of the third DC subcarriers in the frequency domain is a least common multiple of an integer multiple of the frequency bandwidth of a subcarrier, 100 KHz, and the frequency bandwidth of one PRB. Generally, in the LTE system, the frequency bandwidth of one subcarrier is 15 KHz, and the frequency bandwidth of one PRB is 180 KHz. Therefore, if there are at least two third DC subcarriers, the spacing between any two of the third DC subcarriers in the frequency domain is an integer multiple of 900 KHz.

FIG. 1 is a schematic structural diagram of a base station according to an embodiment of the present invention. As shown in FIG. 1, the base station provided in this embodiment of the present invention includes: a processing module 11 and a sending module 12, where the processing module 11 is configured to complete processing of the processing module in the foregoing base station embodiment.

The sending module 12 is configured to: if the second DC subcarrier does not overlap the third DC subcarrier, transmit, on the second DC subcarrier, at least one of the following signals: a reference signal, a control channel, or a data signal.

Specifically, the second DC subcarrier is located, in the frequency domain, at the center frequency location at which the base station transmits the carrier, that is, the second DC subcarrier is located at the 0 Hz subcarrier location of the baseband signal corresponding to the transmit carrier of the base station. Because the UE usually uses zero intermediate frequency design, a radio frequency local-frequency leakage in a zero-intermediate frequency system of the UE causes relatively great interference to a DC carrier at a receive end. The base station usually uses non-zero intermediate frequency design or uses a suppression algorithm for interference caused by the radio frequency local-frequency leakage, so that interference, to the DC carrier, of the radio frequency local-frequency leakage transmitted by the base station may be ignored. However, a situation in which the base station sometimes simplifies implementation due to consideration of reducing costs or because there is no interference is not excluded. Therefore, if the UE uses the zero intermediate frequency design, the third DC subcarrier corresponding to the receive carrier of the UE is greatly interfered with. Consequently, the UE cannot receive data on the third DC subcarrier corresponding to the receive carrier of the UE.

If the second DC subcarrier does not overlap the third DC subcarrier, for the UE, according to an implementation operation factor such as impact, on the second DC subcarrier corresponding to the transmit carrier of the base station, of a non-zero intermediate frequency or zero intermediate frequency structure of a transmit end of the base station, or whether the base station uses the suppression algorithm for the interference caused by the radio frequency local-frequency leakage, and especially according to little impact, on the transmit end, of the radio frequency local-frequency leakage in a non-zero intermediate frequency system, the base station may send data on the second DC subcarrier corresponding to the transmit carrier of the base station. In addition, because the second DC subcarrier is not corresponding to the third DC subcarrier of the UE, the UE may receive and demodulate the data. For the base station side, according to analysis of interference, to the second DC subcarrier on the transmit carrier corresponding to the base station, of the non-zero intermediate frequency or zero intermediate frequency structure of the transmit end on the base station, there may be two processing manners. In one manner, the sending module 12 may normally send data, which may be a control channel, a reference symbol, or a data signal, so that the UE can normally receive the data. This is extremely important for UE in the LTE systems of earlier releases R8 to R12, and the UE can be totally unaffected by an access bandwidth location change. Data transmission may still be performed on the second DC subcarrier corresponding to the transmit carrier of the base station, and backward compatibility is well kept. On the base station side, backward compatibility can be implemented without a need to perform any additional processing, and normal communication can be performed with the UE in the LTE systems of releases R8 to R12. In this case, the transmit end of the base station may determine to use the non-zero intermediate frequency design or to use the suppression algorithm for the interference caused by the radio frequency local-frequency leakage, so that the interference, to the DC carrier, of the radio frequency local-frequency leakage transmitted by the base station may be ignored. In this way, normal data transmission may be performed on a central subcarrier of the transmit end of the base station. For UE in an LTE system in a new release, if data transmission is performed in this manner in a network, that is, the sending module 12 still normally sends data on the second DC subcarrier corresponding to the transmit carrier of the base station, the sending module 12 may notify the new-release UE that a control channel, a reference channel, or a data signal can be normally received and processed on this carrier. In the other manner, the sending module 12 of the base station does not transmit data on this carrier, or the sending module 12 of the base station transmits data but the UE cannot demodulate the data on this subcarrier due to interference. In this case, a network needs to notify a transmission mode of the base station to UE in an LTE system of a new release. That is, the UE cannot normally demodulate data on the second DC subcarrier corresponding to the transmit carrier of the base station. In this case, the UE in the LTE system of the new release performs, for the second DC subcarrier, corresponding processing on a control channel, a reference channel, or a data signal, for example, discarding or data matching or puncturing. Specifically, processing may be performed according to different cases.

If the second DC subcarrier overlaps the third DC subcarrier, the sending module 12 needs to deliver, to the UE, signaling for performing processing on the third DC subcarrier, or the UE performs, by default, processing according to a direct current component DC subcarrier corresponding to the receive carrier of the UE, and does not participate in an operation such as data receiving and demodulation or corresponding measurement. For the base station side, there may be two processing manners on the second DC subcarrier. In one manner, the sending module 12 may normally send data, which may be a control channel, a reference symbol, or data. The other manner depends on a UE distribution status in a network of the base station. If all UEs in the network of the base station perform same processing on the second DC subcarrier, for example, all the UEs need to perform processing on the second DC subcarrier according to signaling delivered by the base station, or the UEs perform, by default, processing according to third DC subcarriers corresponding to receive carriers of the UEs, and do not participate in an operation such as data receiving and demodulation or corresponding measurement, the sending module 12 may not transmit data on the second DC subcarrier, thereby helping to reduce power and improve network performance.

If the first DC subcarrier overlaps the third DC subcarrier, because the first DC subcarrier is a vacated subcarrier, from the perspective of either the base station or the UE, processing may be performed in a pre-defined manner. The sending module 12 does not send data on the first DC subcarrier, and the UE does not perform, on the third DC subcarrier, an operation such as data receiving and demodulation or corresponding measurement.

Further, according to the base station provided in the embodiment shown in FIG. 1, the sending module 12 is further configured to send first signaling to the UE, where the first signaling is used to explicitly or implicitly indicate location information of the first DC subcarrier. That is, after the processing module 11 determines the location of the first DC subcarrier, the sending module 12 needs to send the first signaling to the UE, so as to notify the UE of the location information of the first DC subcarrier. In this way, after receiving the first signaling, the UE may determine the location of the first DC subcarrier. Because the first DC subcarrier is a vacated subcarrier and does not belong to any PRB, the UE that receives the first signaling may determine not to receive or demodulate data at the location of the first DC subcarrier. The first signaling is explicit or implicit signaling. If the first signaling is explicit signaling, the first signaling is radio resource control (Radio Resource Control, RRC) dedicated signaling; or if the first signaling is implicit signaling, the first signaling may be obtained by the UE by performing blind detection on a synchronization channel location. For example, the base station transmits a synchronization channel and/or a broadcast channel on the 72 subcarriers that use the first DC subcarrier as a center, and mapping and transmission methods for the synchronization channel and/or the broadcast channel are the same as those in the LTE system. The UE may perform access according to an access manner in an original LTE system and use this carrier, and a central subcarrier of the access bandwidth may be considered as the first DC subcarrier.

Further, according to the base station provided in the embodiment shown in FIG. 1, the sending module 12 is further configured to send second signaling to the UE, where the second signaling includes location information of the second DC subcarrier and information about whether the second DC subcarrier carries a signal, and the second signaling is RRC dedicated signaling. That is, after the processing module 11 determines the location of the second DC subcarrier, the sending module 12 needs to send the second signaling to the UE, so as to notify the UE of the location information of the second DC subcarrier. In this way, after receiving the second signaling, the UE may determine the location of the second DC subcarrier and the information about whether the second DC subcarrier carries a signal. Because the second DC subcarrier is located at the 0 Hz subcarrier location of the baseband signal corresponding to the transmit carrier of the base station, the UE that receives the second signaling may determine whether to receive or demodulate data on the second DC subcarrier and a specific method for receiving or demodulating data on the second DC subcarrier. The information about whether the second DC subcarrier carries a signal includes information about whether the second DC subcarrier carries a wanted reference signal, control channel, or data signal. The second signaling is RRC dedicated signaling. If the sent second signaling notifies the UE of information that the second DC subcarrier on the carrier does not carry a wanted signal, the UE does not perform demodulation on the second DC subcarrier, but performs rate matching processing on a control channel and a data channel, or punctures and does not receive a control channel and a data channel. If the sent second signaling notifies the UE that the second DC subcarrier on the carrier carries a wanted reference signal, control channel, or data signal, the UE performs demodulation on the second DC subcarrier, and performs receiving processing on a control channel and a data channel. Because the second DC subcarrier is located at the 0 Hz subcarrier location of the baseband signal corresponding to the transmit carrier of the base station, processing manners for all UEs that can observe the subcarrier may be the same. In this way, the second signaling may be RRC broadcast signaling, and may be notified to the UE by using an SIB message or the like, thereby reducing signaling overheads.

Further, according to the base station provided in the embodiment shown in FIG. 1, the sending module 12 is further configured to send third signaling to the UE, where the third signaling includes location information of the at least one third DC subcarrier, and the third signaling is RRC dedicated signaling. That is, after the processing module 11 determines the location of the at least one third DC subcarrier, the sending module 12 needs to send the third signaling to the UE, so as to notify the UE of the location information of the third DC subcarrier. In this way, after receiving the third signaling, the UE may determine a location of each third DC subcarrier. Further, the sending module 12 may notify the UE of information about whether the sending module 12 transmits a signal on the third DC subcarrier. If the third DC subcarrier is located at the 0 Hz subcarrier location of the baseband signal corresponding to the receive carrier of the UE, generally, there is interference on the subcarrier. In this case, the UE may process the subcarrier without depending on the third signaling, that is, the UE discards the subcarrier, and does not perform data receiving or demodulation. If the third DC subcarrier has a location different from the 0 Hz subcarrier location of the baseband signal corresponding to the receive carrier of the UE, that is, the third DC subcarrier and a DC subcarrier on the receive carrier of the UE are not a same carrier, and locations of the two subcarriers do not overlap, the UE may determine, according to the third signaling, the information that the base station transmits a signal on the third DC subcarrier, so that the UE determines whether to perform data receiving or demodulation on the third DC subcarrier, and a specific method for performing data receiving or demodulation on the third DC subcarrier. The information about whether the third DC subcarrier carries a signal includes information about whether the third DC subcarrier carries a wanted reference signal, control channel, or data signal. The third DC subcarrier is RRC dedicated signaling.

Further, according to the base station provided in the embodiment shown in FIG. 1, the processing module 11 is further configured to: determine a fourth DC subcarrier on the carrier, where the fourth DC subcarrier is corresponding, in the frequency domain, to a center frequency location on a carrier that is sent by the UE and that is received by the base station; and determine a fifth DC subcarrier on the carrier, where the fifth DC subcarrier is located, in the frequency domain, at a center frequency location at which the base station receives the carrier sent by the UE.

Specifically, similar to a method for determining a direct current component subcarrier on the base station side, for new-release UE, a new DC subcarrier location may also be defined. Therefore, according to the base station provided in the embodiment shown in FIG. 1, the processing module 11 is further configured to determine the fourth DC subcarrier on the carrier, where the fourth DC subcarrier is corresponding, in the frequency domain, to the center frequency location on the carrier that is sent by the UE and that is received by the base station. A transmit carrier of each UE has a corresponding center frequency. After determining the fourth DC subcarrier on the carrier, the processing module 11 may determine whether to receive, at the location corresponding to the fourth DC subcarrier, uplink data sent by the UE. The processing module 11 determines the fifth DC subcarrier on the carrier, where the fifth DC subcarrier is located, in the frequency domain, at the center frequency location at which the base station receives the carrier sent by the UE. Because a receive carrier bandwidth of the base station may be different from a transmit carrier bandwidth of the UE, the fifth DC subcarrier is located, in the frequency domain, at the center frequency location at which the base station receives the carrier sent by the UE. After determining the fifth DC subcarrier on the carrier, the processing module 11 may determine whether to receive, at the location corresponding to the fifth DC subcarrier, uplink data sent by the UE.

Further, according to the base station provided in the embodiment shown in FIG. 1, the sending module 12 is further configured to: send fourth signaling to the UE, where the fourth signaling includes location information of the fourth DC subcarrier and information about whether the fourth DC subcarrier carries a signal; and send fifth signaling to the UE, where the fifth signaling includes location information of the fifth DC subcarrier and information about whether the fifth DC subcarrier carries a signal. That is, after the processing module 11 determines the location of the fourth DC subcarrier, the sending module 12 needs to send the fourth signaling to the UE, so as to notify the UE of the location information of the fourth DC subcarrier. In this way, after receiving the fourth signaling, the UE may determine the location of the fourth DC subcarrier. Further, the sending module 12 may notify the UE of information about whether the sending module 12 transmits a signal on the fourth DC subcarrier, and the base station further determines whether to receive, at the location of the fourth DC subcarrier, data sent by the UE. After the processing module 11 determines the location of the fifth DC subcarrier, the sending module 12 needs to send the fifth signaling to the UE, so as to notify the UE of the location information of the fifth DC subcarrier. In this way, after receiving the fifth signaling, the UE may determine the location of the fifth DC subcarrier. Further, the sending module 12 may notify the UE of information about whether the sending module 12 transmits a signal on the fifth DC subcarrier, and the base station further determines whether to receive, at the location of the fifth DC subcarrier, data sent by the UE.

Figure 2:
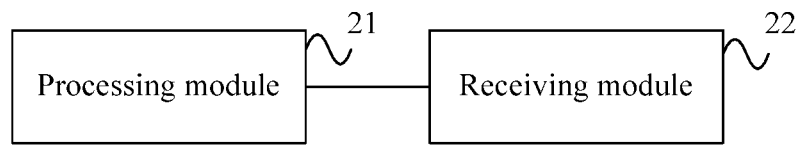
FIG. 2 is a schematic structural diagram of UE according to an embodiment of the present invention.

Corresponding to the base station provided in this embodiment of the present invention, an embodiment of the present invention further provides UE, configured to cooperate with the base station provided in this embodiment of the present invention, so as to resolve a problem existing in an LTE system of a current release. FIG. 2 is a schematic structural diagram of UE according to an embodiment of the present invention. As shown in FIG. 2, the UE provided in this embodiment includes: a processing module 21 and a receiving module 22.

In one implementation manner of the UE shown in FIG. 2, the processing module 21 is configured to: determine a first DC subcarrier on a carrier by using first signaling sent by a base station or by performing blind detection on a synchronization channel location, where the first DC subcarrier is located, in a frequency domain, at a non-center frequency location on the carrier, and a center frequency of the first DC subcarrier is an integer multiple of 100 KHz; and determine a second DC subcarrier on the carrier by using second signaling sent by the base station or by using a preset location relationship between the first DC subcarrier and the second DC subcarrier, where the second DC subcarrier is corresponding, in the frequency domain, to a center frequency location at which the base station sends the carrier, and the first DC subcarrier does not overlap the second DC subcarrier.

Specifically, in LTE systems of existing releases R8 to R12, DC subcarrier is located at a center frequency location on a carrier. In this way, all UEs need to perform access at the center frequency location on a carrier, thereby causing the foregoing problems. However, in this embodiment, the processing module 21 separately determines the first DC subcarrier and the second DC subcarrier, the first DC subcarrier is located, in the frequency domain, at the non-center frequency location on the carrier, and the second DC subcarrier is located, in the frequency domain, at the center frequency location at which the base station transmits the carrier, that is, the processing module 21 determines two DC subcarriers on the carrier. In this way, the base station may choose to send a common control channel such as a PSS, an SSS, and a PBCH on 72 subcarriers that use the first DC subcarrier as a center, or may still send a common control channel such as a PSS, an SSS, and a PBCH on 72 subcarriers that use the second DC subcarrier as a center. That is, the 72 subcarriers that use the first DC subcarrier as a center are used as an access bandwidth, or the 72 subcarriers that use the second DC subcarrier as a center are used as an access bandwidth. The UE may perform access on the first DC subcarrier or on the second DC subcarrier. The center frequency of the first DC subcarrier is an integer multiple of 100 KHz. This is because a UE scanning granularity specified in the LTE system is 100 KHz, that is, the UE scans an access bandwidth at a grid of 100 KHz. Therefore, the center frequency of the first DC subcarrier needs to be an integer multiple of 100 KHz, so as to support access of UE in existing releases R8 to R12. Backward compatibility design is also kept, so that new-release UE can implement access without changing an implementation algorithm for carrier scanning. The second DC subcarrier is located, in the frequency domain, at the center frequency location at which the base station transmits the carrier, that is, the second DC subcarrier is located at a 0 Hz subcarrier location of a baseband signal corresponding to the transmit carrier of the base station. The center frequency location at which the base station transmits the carrier depends on implementation of the base station, and may not be an integer multiple of 100 KHz, that is, a location of the second DC subcarrier in the frequency domain may not be at a grid of 100 KHz. However, if the second DC subcarrier supports access of the UE, especially the UE in existing releases R8 to R12, and a method (that is, a common control channel such as a PSS, an SSS, and a PBCH is sent on 72 subcarriers that use a DC subcarrier as a center, so as to implement the access of the UE) in the LTE systems of existing releases R8 to R12 is used as an access method, the location of the second DC subcarrier in the frequency domain needs to be at a grid of 100 KHz.

According to the UE provided in this embodiment, a first DC subcarrier and a second DC subcarrier are determined, where the first DC subcarrier is located, in a frequency domain, at a non-center frequency location on a carrier, a center frequency of the first DC subcarrier is an integer multiple of 100 KHz, the second DC subcarrier is located, in the frequency domain, at a center frequency location at which a base station transmits the carrier, so that the UE can perform access at two possible candidate locations. The base station may select a location according to interference statuses detected at the different locations, or may randomly select a location, so that different base stations can send common control channels such as PSSs, SSSs, and PBCHs at the two different locations, thereby reducing a collision between transmission locations of common control channels of all cells, and reducing interference between the common control channels of all the cells.

Further, according to the UE provided in the embodiment shown in FIG. 2, a spacing between the first DC subcarrier and the second DC subcarrier in the frequency domain is an integer multiple of a frequency bandwidth of a subcarrier, so as to ensure orthogonality between the first DC subcarrier and the second DC subcarrier on one carrier.

Further, according to the UE provided in the embodiment shown in FIG. 2, the spacing between the first DC subcarrier and the second DC subcarrier in the frequency domain is a least common multiple of 100 KHz and an integer multiple of the frequency bandwidth of a subcarrier.

Further, according to the UE provided in the embodiment shown in FIG. 2, the spacing between the first DC subcarrier and the second DC subcarrier in the frequency domain is a least common multiple of an integer multiple of the frequency bandwidth of a subcarrier, 100 KHz, and a frequency bandwidth of one PRB.

Further, according to the UE provided in the embodiment shown in FIG. 2, the first DC subcarrier does not belong to any PRB on the carrier, and the second DC subcarrier belongs to a PRB on the carrier.

Further, according to the UE provided in the embodiment shown in FIG. 2, the first DC subcarrier is located on a central subcarrier of an access bandwidth of the carrier, the access bandwidth is used to send at least a synchronization channel and a PBCH, and the synchronization channel includes a PSS and an SSS.

Further, according to the UE provided in the embodiment shown in FIG. 2, the processing module 21 is further configured to determine a third DC subcarrier on the carrier by using third signaling sent by the base station or by using a preset location relationship between the first DC subcarrier and the third DC subcarrier, where the third DC subcarrier is located, in the frequency domain, at a center frequency location at which the user equipment UE receives the carrier.

Further, according to the UE provided in the embodiment shown in FIG. 2, a center frequency of the third DC subcarrier is an integer multiple of 100 KHz.

Further, according to the UE provided in the embodiment shown in FIG. 2, if the third DC subcarrier overlaps the first DC subcarrier, the third DC subcarrier does not belong to any PRB on the carrier; or if the third DC subcarrier does not overlap the first DC subcarrier, the third DC subcarrier belongs to a PRB on the carrier.

Further, according to the UE provided in the embodiment shown in FIG. 2, if the third DC subcarrier does not overlap the first DC subcarrier, a spacing between the first DC subcarrier and the third DC subcarrier in the frequency domain is a least common multiple of 100 KHz and an integer multiple of the frequency bandwidth of a subcarrier.

Further, according to the UE provided in the embodiment shown in FIG. 2, if the third DC subcarrier does not overlap the first DC subcarrier, the spacing between the first DC subcarrier and the third DC subcarrier in the frequency domain is a least common multiple of an integer multiple of the frequency bandwidth of a subcarrier, 100 KHz, and the frequency bandwidth of one PRB.

Further, according to the UE provided in the embodiment shown in FIG. 2, the receiving module 22 is configured to: if the second DC subcarrier does not overlap the third DC subcarrier, receive, on the second DC subcarrier, at least one of the following signals: a reference signal, a control channel, or a data signal.

Further, according to the UE provided in the embodiment shown in FIG. 2, the receiving module 22 is further configured to: before the processing module 21 determines the first DC subcarrier on the carrier, receive the first signaling sent by the base station, where the first signaling is used to explicitly or implicitly indicate location information of the first DC subcarrier.

Further, according to the UE provided in the embodiment shown in FIG. 2, if the first signaling is explicit signaling, the first signaling is RRC dedicated signaling; or if the first signaling is implicit signaling, the receiving module obtains the first signaling by performing blind detection on the synchronization channel location.

Further, according to the UE provided in the embodiment shown in FIG. 2, the receiving module 22 is further configured to: before the processing module 21 determines the second DC subcarrier on the carrier, receive the second signaling sent by the base station, where the second signaling includes location information of the second DC subcarrier and information about whether the second DC subcarrier carries a signal, and the second signaling is RRC dedicated signaling.

Further, according to the UE provided in the embodiment shown in FIG. 2, the receiving module 22 is further configured to: before the processing module 21 determines the third DC subcarrier on the carrier, receive the third signaling sent by the base station, where the third signaling includes location information of the at least one third DC subcarrier and information about whether each third DC subcarrier carries a signal, and the third signaling is RRC dedicated signaling.

Further, according to the UE provided in the embodiment shown in FIG. 2, the processing module 21 is further configured to: determine a fourth DC subcarrier on the carrier by using fourth signaling sent by the base station, where the fourth DC subcarrier is located, in the frequency domain, at a center frequency location on a carrier sent by the UE; and determine a fifth DC subcarrier on the carrier by using fifth signaling sent by the base station, where the fifth DC subcarrier is corresponding, in the frequency domain, to a center frequency location at which the base station receives the carrier sent by the UE.

Further, according to the UE provided in the embodiment shown in FIG. 2, the receiving module 22 is further configured to: before the processing module 21 determines the fourth DC subcarrier on the carrier, receive the fourth signaling sent by the base station, where the fourth signaling includes location information of the fourth DC subcarrier and information about whether the fourth DC subcarrier carries a signal; and before the processing module determines the fifth DC subcarrier on the carrier, receive the fifth signaling sent by the base station, where the fifth signaling includes location information of the fifth DC subcarrier and information about whether the fifth DC subcarrier carries a signal.

It should be noted that, a configuration and processing method, of the UE, for the first DC subcarrier, the second DC subcarrier, and the third DC subcarrier in the embodiment shown in FIG. 2 is the same as or similar to that performed by the base station provided in an embodiment of the present invention, and details are not described herein again.

Figure 3:
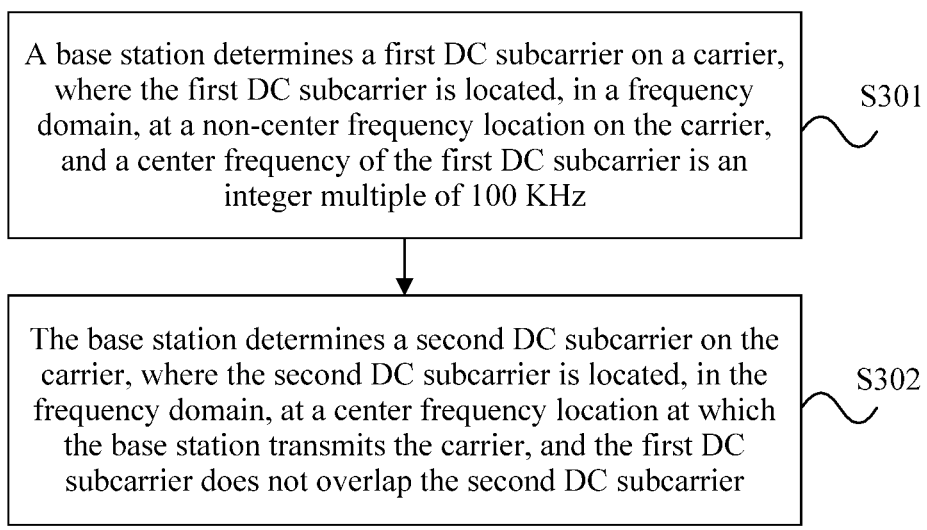
FIG. 3 is a flowchart of Embodiment 1 of a direct current component subcarrier configuration method according to an embodiment of the present invention.

FIG. 3 is a flowchart of Embodiment 1 of a direct current component subcarrier configuration method according to an embodiment of the present invention. As shown in FIG. 3, the method in this embodiment includes the following steps.

Step S301: A base station determines a first DC subcarrier on a carrier, where the first DC subcarrier is located, in a frequency domain, at a non-center frequency location on the carrier, and a center frequency of the first DC subcarrier is an integer multiple of 100 KHz.

Step S302: The base station determines a second DC subcarrier on the carrier, where the second DC subcarrier is located, in the frequency domain, at a center frequency location at which the base station transmits the carrier, and the first DC subcarrier does not overlap the second DC subcarrier.

Specifically, to resolve various problems that are brought by a case in which all UEs in a current LTE system need to perform access on 72 subcarriers that use a DC subcarrier at the center of a carrier as a center, the base station in this embodiment determines two DC subcarriers on the carrier, which are separately the first DC subcarrier and the second DC subcarrier. There is no sequence of performing step S301 and step S302. Generally, step S301 and step S302 are simultaneously performed.

The first DC subcarrier is located, in the frequency domain, at the non-center frequency location on the carrier, and the center frequency of the first DC subcarrier is an integer multiple of 100 KHz. The second DC subcarrier is located, in the frequency domain, at the center frequency location at which the base station transmits the carrier.

In LTE systems of existing releases R8 to R12, DC subcarrier is located at a center frequency location on a carrier. In this way, all UEs need to perform access at the center frequency location on a carrier, thereby causing the foregoing problems. However, in this embodiment, the base station separately determines the first DC subcarrier and the second DC subcarrier, the first DC subcarrier is located, in the frequency domain, at the non-center frequency location on the carrier, and the second DC subcarrier is located, in the frequency domain, at the center frequency location at which the base station transmits the carrier, that is, the base station determines two DC subcarriers on the carrier. In this way, the base station may choose to send a common control channel such as a PSS, an SSS, and a PBCH on 72 subcarriers that use the first DC subcarrier as a center, or may still send a common control channel such as a PSS, an SSS, and a PBCH on 72 subcarriers that use the second DC subcarrier as a center. That is, the 72 subcarriers that use the first DC subcarrier as a center are used as an access bandwidth, or the 72 subcarriers that use the second DC subcarrier as a center are used as an access bandwidth. The center frequency of the first DC subcarrier is an integer multiple of 100 KHz. This is because a UE scanning granularity specified in the LTE system is 100 KHz, that is, the UE scans an access bandwidth at a grid of 100 KHz. Therefore, the center frequency of the first DC subcarrier needs to be an integer multiple of 100 KHz, so as to support access of UE in existing releases R8 to R12. Backward compatibility design is also kept, so that new-release UE can implement access without changing an implementation algorithm for carrier scanning. The second DC subcarrier is located, in the frequency domain, at the center frequency location at which the base station transmits the carrier, that is, the second DC subcarrier is located at a 0 Hz subcarrier location of a baseband signal corresponding to the transmit carrier of the base station. The center frequency location at which the base station transmits the carrier depends on implementation of the base station, and may not be an integer multiple of 100 KHz, that is, a location of the second DC subcarrier in the frequency domain may not be at a grid of 100 KHz. However, if the second DC subcarrier supports access of the UE, especially the UE in existing releases R8 to R12, and a method (that is, a common control channel such as a PSS, an SSS, and a PBCH is sent on 72 subcarriers that use a DC subcarrier as a center, so as to implement the access of the UE) in the LTE systems of existing releases R8 to R12 is used as an access method, the location of the second DC subcarrier in the frequency domain needs to be at a grid of 100 KHz.

According to the direct current component subcarrier configuration method provided in this embodiment, a first DC subcarrier and a second DC subcarrier are determined, where the first DC subcarrier is located, in a frequency domain, at a non-center frequency location on a carrier, a center frequency of the first DC subcarrier is an integer multiple of 100 KHz, the second DC subcarrier is located, in the frequency domain, at a center frequency location at which a base station transmits the carrier, so that the base station can provide, to UE, two candidate locations for accessing. The base station may select a location according to interference statuses detected at the different locations, or may randomly select a location, so that different base stations can send common control channels such as PSSs, SSSs, and PBCHs at the two different locations, thereby reducing a collision between transmission locations of common control channels of all cells, and reducing interference between the common control channels of all the cells.

Another method is as follows: By means of pre-defining or signaling notification, there may be potentially more than one candidate location of the first DC subcarrier on one carrier. The base station may select a location of the first DC subcarrier according to interference statuses detected at the different locations, or the base station may randomly select a location of the first DC subcarrier, so as to perform signal transmission. By using the method in which there is more than one candidate location of the first DC subcarrier, a collision between transmission locations of common control channels of all cells is reduced, and interference between the common control channels of all the cells is reduced. Certainly, there may also be more than one configuration of the first DC subcarrier on one carrier. In this way, the base station can provide, on this carrier, more than one location for accessing, thereby reducing a collision and interference between the common control channels of all the cells.

Because more than one access location is provided on one carrier, it is possible that UEs having different capabilities perform access at different locations and use different bandwidths. For example, for a 40 MHz carrier, if the UE supports only a maximum of 20 MHz carrier access and a use capability, the UE may perform access on a first DC subcarrier defined on the 40 MHz carrier, and use a 20 MHz bandwidth. If the UE may support a maximum of 40 MHz carrier access and use, the UE may perform access on another DC subcarrier that is corresponding to the 40 MHz carrier and that may be a DC subcarrier corresponding to a center frequency of 40 MHz, and use the entire 40 MHz bandwidth. In addition, for UE that has a low capability and low costs, even though a carrier bandwidth is 20 MHz, or with another standard bandwidth in an existing LTE system or a non-standard bandwidth, the UE may use only a partial bandwidth, and may perform access on a first DC subcarrier defined on the 20 MHz carrier, and use a bandwidth of a part of the 20 MHz carrier, where the bandwidth includes at least 72 subcarriers. Other UE performs access on another DC subcarrier that is corresponding to the 20 MHz carrier and that may be a DC subcarrier corresponding to a center frequency on 20 MHz, and use the entire 20 MHz bandwidth.

Further, in the embodiment shown in FIG. 3, the first DC subcarrier does not belong to any PRB on the carrier, and the second DC subcarrier belongs to a PRB on the carrier. In the LTE systems of existing releases R8 to R12, a DC subcarrier is located at a center frequency location on a carrier, and the DC subcarrier does not belong to any PRB, that is, on an entire carrier, there is an independent subcarrier that does not belong to any PRB. To be compatible with the LTE systems of releases R8 to R12, in the embodiment shown in FIG. 3, the first DC subcarrier does not belong to any PRB on the carrier, and the second DC subcarrier belongs to a PRB on the carrier. In this way, it can be ensured that with a same bandwidth, a quantity of subcarriers on the carrier and a quantity of PRBs on the carrier are the same as those in the LTE systems of releases R8 to R12, and a guard bandwidth on either side of the carrier is the same as that with the same bandwidth in the LTE systems of releases R8 to R12. Therefore, a system compatibility requirement can be met; in addition, requirements of a design parameter and indicator in the original LTE system are further maintained, current implementation algorithms of the base station and the UE are reused, and neither additional implementation complexity is introduced nor additional standardization impact is imposed.

Further, in the embodiment shown in FIG. 3, a spacing between the first DC subcarrier and the second DC subcarrier in the frequency domain is an integer multiple of a frequency bandwidth of a subcarrier, so as to ensure orthogonality between the first DC subcarrier and the second DC subcarrier on a carrier. In another aspect, for different cells, for example, a first cell sends a common control channel by using the first DC subcarrier as a center, and a second base station sends a common control channel by using the second DC subcarrier as a center; if the spacing between the first DC subcarrier and the second DC subcarrier in the frequency domain is an integer multiple of the frequency bandwidth of a subcarrier, each subcarrier in a cell served by the first base station can be aligned with each subcarrier in a cell served by the second base station, thereby facilitating coordination of interference between the two cells. Generally, a frequency bandwidth of one subcarrier in the LTE system is 15 KHz, that is, the spacing between the first DC subcarrier and the second DC subcarrier in the frequency domain is an integer multiple of 15 KHz.

Further, in the embodiment shown in FIG. 3, the spacing between the first DC subcarrier and the second DC subcarrier in the frequency domain is a least common multiple of 100 KHz and an integer multiple of the frequency bandwidth of a subcarrier. Because a UE scanning granularity in the LTE system is 100 KHz, when the second DC subcarrier is also configured at a grid of 100 KHz to support access of the UE, the spacing between the first DC subcarrier and the second DC subcarrier further needs to be an integer multiple of 100 KHz. With reference to that the spacing between the first DC subcarrier and the second DC subcarrier is an integer multiple of the frequency bandwidth of a subcarrier, the spacing between the first DC subcarrier and the second DC subcarrier in the frequency domain is a least common multiple of 100 KHz and an integer multiple of the frequency bandwidth of a subcarrier. Because a frequency bandwidth of one subcarrier in the current LTE system is 15 KHz, and a least common multiple of 15 KHz and 100 KHz is 300 KHz, the spacing between the first DC subcarrier and the second DC subcarrier needs to be an integer multiple of 300 KHz.

Further, in the embodiment shown in FIG. 3, the spacing between the first DC subcarrier and the second DC subcarrier in the frequency domain is a least common multiple of an integer multiple of the frequency bandwidth of a subcarrier, 100 KHz, and a frequency bandwidth of one PRB. In the LTE system, one PRB includes 12 consecutive subcarriers (one PRB includes 12 consecutive available subcarriers in the frequency domain other than a vacated DC subcarrier) in the frequency domain; therefore, a frequency bandwidth of one PRB is 180 KHz. When determining the first DC subcarrier and the second DC subcarrier on the carrier, the base station determines to send a common control channel such as a PSS, an SSS, and a PBCH by using the first DC subcarrier as a center, so that the UE performs access on the 72 subcarriers that use the first DC subcarrier as a center. In this way, the UE further determines, according to a system bandwidth indicated by the PBCH, sorting and locations of PRBs corresponding to the foregoing 72 subcarriers. When the first DC subcarrier and the second DC subcarrier may support access, and different UEs may perform access on different DC subcarriers, to ensure that PRBs included on the carrier may be centrally sorted and numbered and that the base station performs overall PRB scheduling, an integer quantity of PRBs need to exist between the first DC subcarrier and the second DC subcarrier, so that PRBs observed by different UEs are as aligned as possible, thereby avoiding interleaving and overlapping between PRB resources observed by different UEs, and also facilitating coordination of interference between two cells by using a PRB granularity. In this case, the spacing between the first DC subcarrier and the second DC subcarrier in the frequency domain further needs to be an integer multiple of the frequency bandwidth of one PRB. With reference to the foregoing aspects, the spacing between the first DC subcarrier and the second DC subcarrier in the frequency domain is a least common multiple of an integer multiple of the frequency bandwidth of a subcarrier, 100 KHz, and the frequency bandwidth of one PRB. Generally, in the LTE system, the frequency bandwidth of one subcarrier is 15 KHz, the frequency bandwidth of one PRB is 180 KHz, and a least common multiple of 15 KHz, 100 KHz, and 180 KHz is 900 KHz, that is, the spacing between the first DC subcarrier and the second DC subcarrier in the frequency domain is an integer multiple of 900 KHz.

It should be noted that, in the LTE systems of releases R8 to R12, a DC subcarrier is located at a center frequency location on a carrier, and the DC subcarrier does not belong to any PRB. However, in the embodiment shown in FIG. 3, the first DC subcarrier is not at a central location on the carrier, and the first DC subcarrier does not belong to any PRB. The second DC subcarrier is at the central location on the carrier, and the second DC subcarrier belongs to a PRB. In this way, if the spacing between the first DC subcarrier and the second DC subcarrier in the frequency domain is an integer multiple of 900 KHz, not all PRBs of the carrier can be aligned, and PRBs on which subcarriers between the first DC subcarrier and the second DC subcarrier are located cannot be aligned. Generally, there is one subcarrier difference. However, boundaries of other PRBs than the PRBs corresponding to the subcarriers between the first DC subcarrier and the second DC subcarrier are aligned. In this way, it can be ensured that PRBs on the carrier can be as aligned as possible, thereby facilitating data scheduling and cell interference coordination of the base station.

Further, in the embodiment shown in FIG. 3, the first DC subcarrier is located on a central subcarrier of an access bandwidth of the carrier, the access bandwidth is used to send at least a synchronization channel and a PBCH, and the synchronization channel includes a PSS and an SSS.

Specifically, the first DC subcarrier determined by the base station is further located on the central subcarrier of the access bandwidth of the carrier, the access bandwidth is used to send at least a synchronization channel and a PBCH, and the synchronization channel includes a PSS and an SSS. In the LTE systems of existing releases R8 to R12, the access bandwidth is located at the center frequency location on a carrier, that is, the UE can perform access only at the center frequency location on a carrier. The first DC subcarrier is used as a center of the access bandwidth of the carrier, so that the UE can perform access at the non-center frequency location on the carrier, thereby avoiding interference caused because common control channels such as PSSs, SSSs, and PBCHs of multiple cells are all located at a central location on the carrier.

Figure 4:
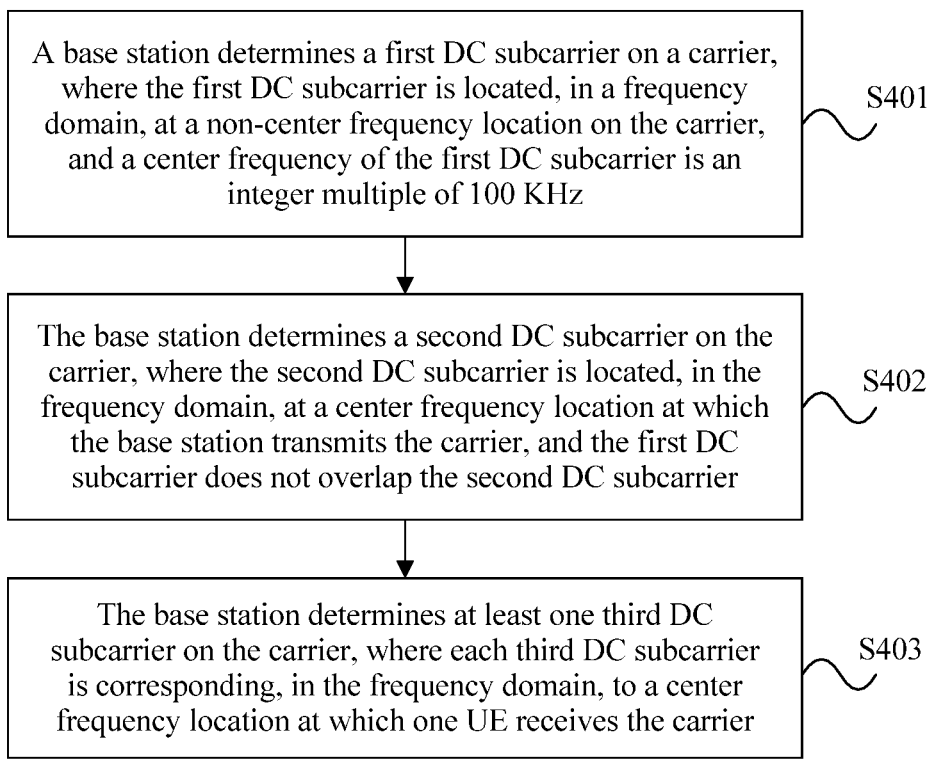
FIG. 4 is a flowchart of Embodiment 2 of a direct current component subcarrier configuration method according to an embodiment of the present invention.

FIG. 4 is a flowchart of Embodiment 2 of a direct current component subcarrier configuration method according to an embodiment of the present invention. As shown in FIG. 4, the method in this embodiment includes the following steps.

Step S401: A base station determines a first DC subcarrier on a carrier, where the first DC subcarrier is located, in a frequency domain, at a non-center frequency location on the carrier, and a center frequency of the first DC subcarrier is an integer multiple of 100 KHz.

Step S402: The base station determines a second DC subcarrier on the carrier, where the second DC subcarrier is located, in the frequency domain, at a center frequency location at which the base station transmits the carrier, and the first DC subcarrier does not overlap the second DC subcarrier.

Step S403: The base station determines at least one third DC subcarrier on the carrier, where each third DC subcarrier is corresponding, in the frequency domain, to a center frequency location at which one UE receives the carrier.

Specifically, based on the embodiment shown in FIG. 1, in the direct current component subcarrier configuration method provided in this embodiment, the base station further determines at least one third DC subcarrier on the carrier.

From the perspective of UE that accesses the base station, the third DC subcarrier is located at a 0 Hz subcarrier location of a baseband signal corresponding to a receive carrier of the UE. Each UE that accesses the base station is corresponding to one third DC subcarrier, and third DC subcarriers corresponding to different types of UEs or UEs having different capabilities may have different locations in the frequency domain. From the perspective of the base station, each third DC subcarrier is corresponding, in the frequency domain, to the center frequency location at which one UE receives the carrier.

Different UEs may have different receive carrier bandwidths. Specifically, a receive carrier of UE may be an entire transmit carrier of the base station, and in this case, a transmit carrier bandwidth of the base station is equal to a receive carrier bandwidth of the UE; or a receive carrier of UE may be a part of a transmit carrier bandwidth of the base station, and in this case, the transmit carrier bandwidth of the base station is not equal to a receive carrier bandwidth of the UE. Generally, the transmit carrier bandwidth of the base station is higher than the receive carrier bandwidth of the UE. In this way, receive carrier bandwidths of different types of UEs or UEs having different capabilities may be different, and third DC subcarriers of the UEs may have different locations on the carrier. Therefore, from the perspective of the base station, there is more than one third DC subcarrier on the carrier, and these third DC subcarriers may be located at different frequency-domain locations.

Likewise, considering that a UE scanning granularity designed in an LTE system is 100 KHz, to reduce impact on UE implementation, a center frequency of the third DC subcarrier is an integer multiple of 100 KHz.

Further, from the perspective of the UE, the third DC subcarrier is located at the 0 Hz subcarrier location of the baseband signal corresponding to the receive carrier of the UE, that is, the center frequency location at which the UE receives the carrier. Therefore, from the perspective of the base station, the third DC subcarrier may overlap the first DC subcarrier or the second DC subcarrier. To ensure that all PRBs of the transmit carrier of the base station are aligned with all PRBs of the receive carrier of the UE, if the third DC subcarrier overlaps the first DC subcarrier, the third DC subcarrier does not belong to any PRB on the carrier; or if the third DC subcarrier does not overlap the first DC subcarrier, the third DC subcarrier belongs to a PRB on the carrier.

Likewise, because both subcarrier alignment and the UE scanning granularity need to be considered, if the third DC subcarrier does not overlap the first DC subcarrier, a spacing between the first DC subcarrier and the third DC subcarrier in the frequency domain is a least common multiple of 100 KHz and an integer multiple of a frequency bandwidth of a subcarrier. Generally, a frequency bandwidth of one subcarrier in the LTE system is 15 KHz. Therefore, if the third DC subcarrier does not overlap the first DC subcarrier, the spacing between the first DC subcarrier and the third DC subcarrier in the frequency domain is an integer multiple of 300 KHz.

In addition, because all the subcarrier alignment, the UE scanning granularity, and PRB alignment need to be considered, if the third DC subcarrier does not overlap the first DC subcarrier, the spacing between the first DC subcarrier and the third DC subcarrier in the frequency domain is a least common multiple of an integer multiple of the frequency bandwidth of a subcarrier, 100 KHz, and a frequency bandwidth of one PRB. Generally, in the LTE system, a frequency bandwidth of one subcarrier is 15 KHz, and a frequency bandwidth of one PRB is 180 KHz. Therefore, if the third DC subcarrier does not overlap the first DC subcarrier, the spacing between the first DC subcarrier and the third DC subcarrier in the frequency domain is an integer multiple of 900 KHz.

Further, if there are at least two third DC subcarriers, because a third DC subcarrier corresponding to any UE needs to meet a grid of 100 KHz, a spacing between any two of the third DC subcarriers in the frequency domain is a least common multiple of 100 KHz and an integer multiple of the frequency bandwidth of a subcarrier. Generally, a frequency bandwidth of one subcarrier in the LTE system is 15 KHz. Therefore, if there are at least two third DC subcarriers, the spacing between any two of the third DC subcarriers in the frequency domain is an integer multiple of 300 KHz.

Further, if there are at least two third DC subcarriers, because two third DC subcarriers are spaced by an integer quantity of PRB granularities, the spacing between any two of the third DC subcarriers in the frequency domain is a least common multiple of an integer multiple of the frequency bandwidth of a subcarrier, 100 KHz, and the frequency bandwidth of one PRB. Generally, in the LTE system, the frequency bandwidth of one subcarrier is 15 KHz, and the frequency bandwidth of one PRB is 180 KHz. Therefore, if there are at least two third DC subcarriers, the spacing between any two of the third DC subcarriers in the frequency domain is an integer multiple of 900 KHz.

Further, in the embodiment shown in FIG. 4, if the second DC subcarrier does not overlap the third DC subcarrier, the base station transmits, on the second DC subcarrier, at least one of the following signals: a reference signal, a control channel, or a data signal.

Specifically, the second DC subcarrier is located, in the frequency domain, at the center frequency location at which the base station transmits the carrier, that is, the second DC subcarrier is located at a 0 Hz subcarrier location of a baseband signal corresponding to the transmit carrier of the base station. Because the UE usually uses zero intermediate frequency design, a radio frequency local-frequency leakage in a zero-intermediate frequency system of the UE causes relatively great interference to a DC carrier at a receive end. The base station usually uses non-zero intermediate frequency design or uses a suppression algorithm for interference caused by the radio frequency local-frequency leakage, so that interference, to the DC carrier, of the radio frequency local-frequency leakage transmitted by the base station may be ignored. Therefore, if the UE uses the zero intermediate frequency design, the third DC subcarrier corresponding to the receive carrier of the UE is greatly interfered with. Consequently, the UE cannot receive data on the third DC subcarrier corresponding to the receive carrier of the UE.

If the second DC subcarrier does not overlap the third DC subcarrier, for the UE, according to an implementation operation factor such as impact, on the second DC subcarrier corresponding to the transmit carrier of the base station, of a non-zero intermediate frequency or zero intermediate frequency structure of a transmit end of the base station, or whether the base station uses the suppression algorithm for the interference caused by the radio frequency local-frequency leakage, and especially according to little impact, on the transmit end, of the radio frequency local-frequency leakage in a non-zero intermediate frequency system, the base station may send data on the second DC subcarrier corresponding to the transmit carrier of the base station. In addition, because the second DC subcarrier is not corresponding to the third DC subcarrier of the UE, the UE may receive and demodulate the data. For the base station side, according to analysis of interference, to the second DC subcarrier on the transmit carrier corresponding to the base station, of the non-zero intermediate frequency or zero intermediate frequency structure of the transmit end on the base station, there may be two processing manners. In one manner, the base station may normally send data, which may be a control channel, a reference symbol, or a data signal, so that the UE can normally receive the data. This is extremely important for UE in LTE systems of releases R8 to R12, and the UE can be totally unaffected by an access bandwidth location change. Data transmission may still be performed on the second DC subcarrier corresponding to the transmit carrier of the base station, and backward compatibility is well kept. On the base station side, backward compatibility can be implemented without a need to perform any additional processing, and normal communication can be performed with the UE in the LTE systems of releases R8 to R12. For UE in an LTE system in a new release, if data transmission is performed in this manner in a network, that is, data is still normally sent on the second DC subcarrier corresponding to the transmit carrier of the base station, the base station may notify the new-release UE that a control channel, a reference channel, or a data signal can be normally received and processed on this carrier. In the other manner, the base station does not transmit data on this carrier, or the base station transmits data but the UE cannot demodulate the data on this subcarrier due to interference. In this case, a network needs to notify a transmission mode of the base station to UE in an LTE system of a new release. That is, the UE cannot normally demodulate data on the second DC subcarrier corresponding to the transmit carrier of the base station. In this case, the UE in the LTE system of the new release performs, for the second DC subcarrier, corresponding processing on a control channel, a reference channel, or a data signal, for example, discarding or data matching or puncturing. Specifically, processing may be performed according to different cases.

If the second DC subcarrier overlaps the third DC subcarrier, the base station needs to deliver, to the UE, signaling for performing processing on the third DC subcarrier, or the UE performs, by default, processing according to a direct current component DC subcarrier corresponding to the receive carrier of the UE, and does not participate in an operation such as data receiving and demodulation or corresponding measurement. For the base station side, there may be two processing manners on the second DC subcarrier. In one manner, the base station may normally send data, which may be a control channel, a reference symbol, or data. The other manner depends on a UE distribution status in a network of the base station. If all UEs in the network of the base station perform same processing on the second DC subcarrier, for example, all the UEs need to perform processing on the second DC subcarrier according to signaling delivered by the base station, or the UEs perform, by default, processing according to third DC subcarriers corresponding to receive carriers of the UEs, and do not participate in an operation such as data receiving and demodulation or corresponding measurement, the base station may not transmit data on the second DC subcarrier, thereby helping to reduce power and improve network performance.

If the first DC subcarrier overlaps the third DC subcarrier, because the first DC subcarrier is a vacated subcarrier, from the perspective of either the base station or the UE, processing may be performed in a pre-defined manner. The base station does not send data on the first DC subcarrier, and the UE does not perform, on the third DC subcarrier, an operation such as data receiving and demodulation or corresponding measurement.

Figure 5:
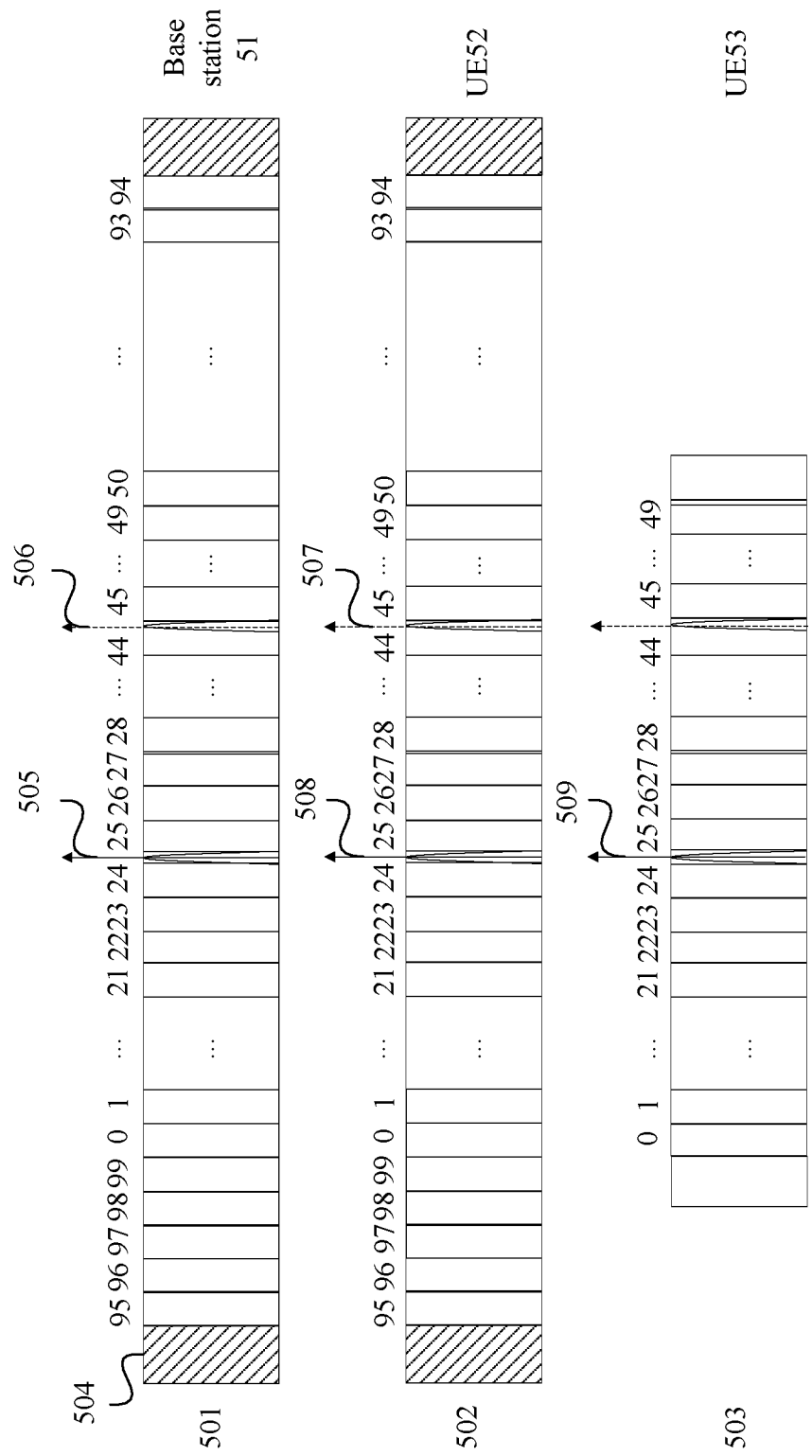
FIG. 5 is a first schematic diagram of a direct current component subcarrier configuration according to an embodiment of the present invention.

The direct current component subcarrier configuration methods provided in the embodiments shown in FIG. 3 and FIG. 4 are further described in the following by using a specific embodiment. FIG. 5 is a first schematic diagram of a direct current component subcarrier configuration according to an embodiment of the present invention. As shown in FIG. 5, a sequence 501 is a carrier configuration sequence of a base station 51, a sequence 502 is a carrier configuration sequence of UE 52, and a sequence 503 is a carrier configuration sequence of UE 53. A carrier bandwidth of the base station 51 in FIG. 5 is 20 MHz, and includes a total of 100 PRBs, which are separately numbered by using 0 to 99. In the sequence 501, sorting is sequentially performed on PRBs starting at a PRB whose number is 95, and ends with a PRB whose number is 94. The 100 PRBs on a carrier and a guard bandwidth 504 on one side of the carrier jointly form the 20 MHz bandwidth. In the sequence 501, a first DC subcarrier 505 is configured between a PRB whose number is 24 and a PRB whose number is 25. The first DC subcarrier 505 is a vacated subcarrier, and the first DC subcarrier 505 does not belong to any PRB. A second DC subcarrier 506 is configured at the center of the entire carrier, that is, on a PRB whose number is 44. The second DC subcarrier 506 is a subcarrier on the PRB whose number is 44. A spacing between the first DC subcarrier 505 and the second DC subcarrier 506 is 20 PRBs, that is, 3600 KHz, which is an integer multiple of 900 KHz and includes an integer quantity of PRBs. An access bandwidth on the transmit carrier of the base station 51 occupies 72 subcarriers that use the first DC subcarrier 505 as a center, that is, subcarriers on a PRB whose number is 22 to a PRB whose number is 27.

A bandwidth of the UE 52 is also 20 MHz, that is, the receive carrier bandwidth of the UE 52 is equal to the transmit carrier bandwidth of the base station 51. A DC subcarrier 507 corresponding to a receive carrier of the UE 52 is located at a center frequency location on the receive carrier of the UE 52, that is, on a PRB whose number is 44. In addition, to be corresponding to the first DC subcarrier 505 on the transmit carrier of the base station 51, a vacated subcarrier 508 is also configured, on the receive carrier of the UE 52, between a PRB whose number is 24 and a PRB whose number is 25. In addition, to support access of the UE 52, the base station 51 needs to configure, on the transmit carrier of the base station 51, a third DC subcarrier corresponding to the DC subcarrier 507. The third DC subcarrier that is on the transmit carrier of the base station 51 and is corresponding to the UE 52 overlaps the second DC subcarrier 506. If the UE 52 uses zero intermediate frequency design, the DC subcarrier 507 corresponding to the receive carrier of the UE 52 is greatly interfered with. Therefore, the UE 52 cannot receive data on the DC subcarrier 507 corresponding to the receive carrier of the UE 52. On the third DC subcarrier that is on the transmit carrier and is corresponding to the UE 52, the base station 51 may perform processing in two manners. In one manner, the base station 51 may normally send data, which may be a control channel, a reference symbol, or data. The other manner depends on a UE distribution status in a network of the base station 51. If all UEs in the network of the base station 51 perform same processing on this DC subcarrier, for example, all the UEs need to process this DC subcarrier according to signaling delivered by the base station 51, or the UEs perform, by default, processing according to DC subcarriers corresponding to receive carriers of the UEs, and do not participate in an operation such as data receiving and demodulation or corresponding measurement, the base station 51 may not transmit data on this DC subcarrier, thereby helping to reduce power and improve network performance.

A bandwidth of the UE 53 is 10 MHz, that is, the receive carrier bandwidth of the UE 53 is lower than the transmit carrier bandwidth of the base station 51, and the receive carrier bandwidth of the UE 53 is symmetric with respect to an access bandwidth. Therefore, for the UE 53, a DC subcarrier 509 corresponding to a receive carrier of the UE 53 is at a center frequency that is on the receive carrier of the UE 53 and that is the same as a center frequency of the access bandwidth of the base station 51. Therefore, a third DC subcarrier that is on the transmit carrier of the base station 51 and is corresponding to the UE 53 overlaps the first DC subcarrier 505. Therefore, the DC subcarrier 509 is a vacated subcarrier and does not belong to any PRB. For the UE 53, the DC subcarrier corresponding to the receive carrier of the UE 53 overlaps the first DC subcarrier 505 corresponding to the transmit carrier of the base station, but does not overlap the second DC subcarrier 506 corresponding to the transmit carrier of the base station. If the UE 53 uses a zero intermediate frequency structure, for the UE 53, the DC subcarrier 509 corresponding to the receive carrier of the UE 53 is greatly interfered with. Therefore, the UE 53 cannot receive data on the DC subcarrier 509 corresponding to the receive carrier of the UE 53. However, the DC subcarrier 509 corresponding to the receive carrier of the UE 53 overlaps the first DC subcarrier 505 corresponding to the transmit carrier of the base station 51, and is corresponding to a vacated subcarrier. Therefore, from the perspective of either the base station 51 or the UE 53, processing may be performed in a pre-defined manner. The base station 51 does not send data on the vacated subcarrier, and the UE 53 does not perform, on the vacated subcarrier, an operation such as data receiving and demodulation or corresponding measurement.

In another aspect, the DC subcarrier 509 corresponding to the UE 53 does not overlap the second DC subcarrier 506 corresponding to the transmit carrier of the base station 51. Therefore, for the UE 53, according to impact, on the second DC subcarrier 506 corresponding to the transmit carrier of the base station 51, of a non-zero intermediate frequency or zero intermediate frequency structure of a transmit end of the base station 51, especially according to less impact, on the transmit end, of a radio frequency local-frequency leakage of a non-zero intermediate frequency system, the base station 51 may send data on the second DC subcarrier 506 corresponding to the transmit carrier of the base station 51. In addition, because the subcarrier is not corresponding to the DC subcarrier 509 of the UE 53, the UE 53 may receive and demodulate the data. For the base station 51, according to analysis of interference, to the DC subcarrier on the transmit carrier corresponding to the base station, of the non-zero intermediate frequency or zero intermediate frequency structure of the transmit end of the base station 51, there may be two processing manners. In one manner, the base station 51 may normally send data, which may be a control channel, a reference symbol, or a data signal, so that UE such as the UE 53 may normally receive the data, that is, the DC subcarrier 509 corresponding to the UE 53 does not overlap the second DC subcarrier 506 corresponding to the transmit carrier of the base station 51. This is extremely important for earlier-release UE in releases R8 to R12, and the UE can be totally unaffected by an access bandwidth location change. Data transmission may still be performed on the second DC subcarrier 506 corresponding to the transmit carrier of the base station 51, and backward compatibility is well kept. The base station 51 can implement backward compatibility without a need to perform any additional processing, and can normally communicate with the earlier-release UE in releases R8 to R12. For new-release UE, if data transmission is performed in this manner in a network, that is, data is still normally sent on the second DC subcarrier 506 corresponding to the transmit carrier of the base station 51, the base station 51 may notify the new UE that a control channel, a reference channel, or a data signal can be normally received and processed on this carrier. In the other manner, the base station 51 does not transmit data on this carrier, or the base station 51 transmits data but the UE 53 cannot demodulate the data on this subcarrier due to interference. In this case, a network needs to notify a transmission mode of the base station 51 to new-release UE. That is, the UE 53 cannot normally demodulate data on the second DC subcarrier 506 corresponding to the transmit carrier of the base station 51. In this case, the new UE performs, for this subcarrier, corresponding processing on a control channel, a reference channel, or a data signal, for example, discarding or data matching or puncturing. Specifically, processing may be performed according to different cases. For example, when the second DC subcarrier 506 corresponding to the transmit carrier of the base station 51 affects only the new-release UE, processing may be performed with reference to Table 2. If the second DC subcarrier 506 corresponding to the transmit carrier of the base station 51 affects not only the new-release UE but also the earlier-release UE, processing may be performed with reference to Table 3. Specifically, a used table or processing manners for different channels or signals may be notified to the new-release UE by using signaling.

TABLE 2

| Reference signal/channel | Processing method for avoiding a collision with a DC subcarrier | Remarks |
|---|---|---|
| CRS | (a) A collision is avoided by means of cell identity planning: According to a method for determining, by using a cell identity, a frequency-domain subcarrier location occupied by a CRS, that is, $v_{shift} = N_{ID}^{cell} \mod 6$, after a DC subcarrier location is determined, a collision between a DC subcarrier and the CRS may be avoided by means of cell identity selection. | This is an implementation-based method, which can be supported without an additional standard change. |
| | (b) A CRS signal is punctured, that is, when the CRS collides with a DC subcarrier, the CRS on the subcarrier is punctured during processing, and UE does not participate in CRS channel estimation, or an operation such as measurement or demodulation. | A base station may notify the UE by using implicit or explicit signaling. |
| Channel state information-reference signal (Channel State information Reference Signal, CSI-RS) | If a CSI-RS collides with a DC subcarrier, a collided CSI-RS resource element (Resource Element, RE) is disabled (that is, the CSI-RS resource is not configured) or puncturing operation is performed on a collided CSI-RS resource element. Because the collided CSI-RS is interfered with, processing such as measurement is no longer performed by using the collided CSI-RS RE. | An implementation-based method may be used, which can be supported without an additional standard change; or a base station may also notify UE by using implicit or explicit signaling. |
| Demodulation reference signal (De Modulation Reference Signal, DMRS) | If a DMRS collides with a DC subcarrier, a collided DMRS RE is disabled (that is, the DMRS resource is not configured) or puncturing operation is performed on a collided DMRS RE. Because the collided DMRS is interfered with, processing such as channel estimation is no longer performed by using the collided DMRS RE. | An implementation-based method may be used, which can be supported without an additional standard change; or a base station may also notify UE by using implicit or explicit signaling. |

TABLE 2-continued

| Reference signal/channel | Processing method for avoiding a collision with a DC subcarrier | Remarks |
| --- | --- | --- |
| Physical downlink shared channel (Physical Downlink Shared Channel, PDSCH) | If a PDSCH collides with a DC subcarrier, and there is interference on the DC subcarrier (that is, the DC subcarrier cannot normally carry a wanted signal), a base station may notify UE of a processing manner on the subcarrier, for example, the UE does not participate in data demodulation. In this way, on the DC subcarrier, rate matching or puncturing processing needs to be performed on the PDSCH channel, so that the UE may determine how to perform an operation on the subcarrier when receiving the PDSCH or demodulating the PDSCH. | The base station may instruct, by using implicit or explicit signaling, the UE how to perform processing on a subcarrier that is of the PDSCH and that collides with the DC subcarrier, that is, to perform effective data transmission or perform, on the DC subcarrier, rate matching or puncturing processing on the PDSCH channel. |
| Enhanced physical downlink control channel (Enhanced PDCCH, EPDCCH) | (a) If subcarriers in a PRB include a DC subcarrier, and there is interference on the DC subcarrier (that is, the DC subcarrier cannot normally carry a wanted signal), the PRB cannot be configured to be used to transmit an EPDCCH. | This is an EPDCCH resource restriction method in which restriction may be performed by means of standardization or by using an implementation-based method. |
| | (b) If an EPDCCH collides with a DC subcarrier, and there is interference on the DC subcarrier (that is, the DC subcarrier cannot normally carry a wanted signal), a base station may notify UE of a processing manner on the subcarrier, for example, the UE does not participate in transmitting the EPDCCH control channel. In this way, on the DC subcarrier, rate matching or puncturing processing needs to be performed on the EPDCCH, so that the UE may determine how to perform an operation on the subcarrier when receiving the EPDCCH or demodulating the EPDCCH. | The base station may also notify the UE by using implicit or explicit signaling. |

TABLE 3

| Reference signal/channel | Processing method for avoiding a collision with a DC subcarrier | Remarks |
| --- | --- | --- |
| CRS | A collision is avoided by means of cell identity planning: According to a method for determining, by using a cell identity, a frequency-domain subcarrier location occupied by a CRS, that is, $v_{shift} = N_{ID}^{cell} \mod 6$, after a DC subcarrier location is determined, a collision between a DC subcarrier and the CRS may be avoided by means of cell identity selection. | This is an implementation-based method, which can be supported without an additional standard change. |
| CSI-RS | If a CSI-RS collides with a DC subcarrier, a collided CSI-RS RE is disabled (that is, the CSI-RS resource is not configured). | This is an implementation-based method in which a base station performs configuration restriction on the CSI-RS resource. |
| DMRS | If a DMRS collides with a DC subcarrier, a collided DMRS RE is disabled (that is, the DMRS resource is not configured). | This is an implementation-based method in which a base station performs configuration restriction or data scheduling restriction on the DMRS resource. |
| PSS/SSS | (a) Avoid a case in which a DC subcarrier is mapped to an area in which a PSS/SSS is transmitted. | This may be implemented on an entire carrier by restricting an access bandwidth. |

TABLE 3-continued

| Reference signal/channel | Processing method for avoiding a collision with a DC subcarrier | Remarks |
| --- | --- | --- |
| | (b) If a PSS/SSS collides with a DC subcarrier, puncturing processing is performed on the PSS/SSS, or UE normally detects the PSS/SSS. | An implementation method that reduces PSS/SSS detection performance |
| PDCCH | (a) A PDCCH may be transmitted by using a CCE whose aggregation level is relatively high, so as to suppress a performance loss caused by DC subcarrier interference<br>(b) Increase PDCCH transmission power, so as to reduce a performance loss caused by DC subcarrier interference | An implementation method that affects transmission of a base station and PDCCH algorithm scheduling |
| Physical control format indicator channel (Physical Control Format Indicatior Channel, PCFICH) | Restrict cell identity selection, so as to avoid a collision between a PCFICH and a DC subcarrier | An implementation method that affects cell identity selection and planning |
| Physical hybrid automatic repeat request indicator channel (Physical Hybrid ARQ Indicator Channel, PHICH) | Restrict cell identity selection, so as to avoid a collision between a PIHCH and a DC subcarrier | An implementation method that affects cell identity selection and planning |
| PDSCH | If a PRB of a PDSCH collides with a DC subcarrier, and there is interference on the DC subcarrier (that is, the DC subcarrier cannot normally carry a wanted signal), by restricting the PRB, a base station may not schedule and use the PRB, especially for earlier-release UE. | An implementation method that affects transmission of the base station and PDSCH algorithm scheduling |
| EPDCCH | If subcarriers in a PRB include a DC subcarrier, and there is interference on the DC subcarrier (that is, the DC subcarrier cannot normally carry a wanted signal), the PRB cannot be configured to be used to transmit an EPDCCH. | An EPDCCH resource restriction method in which restriction may be performed by means of standardization or by using an implementation-based method |
| PBCH | (a) Avoid a case in which a DC subcarrier is mapped to an area in which a PBCH is transmitted. | This may be implemented by restricting a location that is of an access bandwidth and that is on an entire carrier. |
| | (b) If a PBCH collides with a DC subcarrier, puncturing processing is performed on the PBCH, or UE considers, by default, that the DC subcarrier can be used for PBCH transmission, and accepts interference brought by the DC subcarrier | An implementation solution |
| Physical multicast channel (Physical Multicast Channel, PMCH) | If a PMCH collides with a DC subcarrier, puncturing processing is performed on the PMCH. | An implementation solution |

Figure 6:
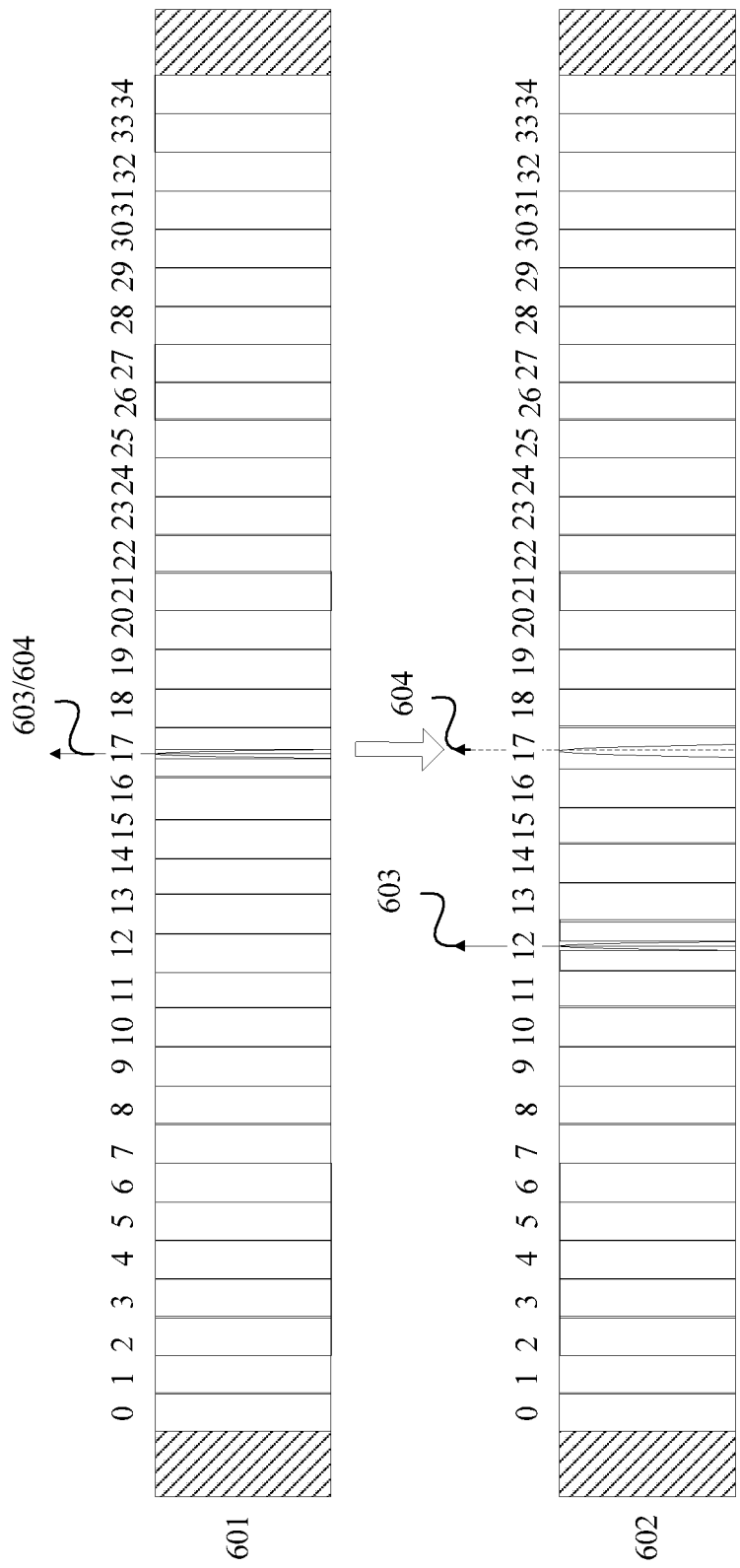
FIG. 6 is a second schematic diagram of a direct current component subcarrier configuration according to an embodiment of the present invention.

FIG. 6 is a second schematic diagram of a direct current component subcarrier configuration according to an embodiment of the present invention. In FIG. 6, a direct current component subcarrier configuration method provided in embodiments of the present invention is described by using a carrier having a non-standard bandwidth. In FIG. 6, a carrier bandwidth is 7 MHz, and includes 35 PRBs, which are separately PRBs numbered from 0 to 34. As shown in FIG. 6, a sequence 601 is a carrier structure sequence similar to that in a conventional LTE system, and a sequence 602 is a carrier structure sequence configured by using the direct current component subcarrier configuration method provided in the embodiments of the present invention. It can be learned from the sequence 601 that, a first DC subcarrier 603 is located at the center location on the carrier, that is, at the center of a PRB whose number is 17. In addition, the first DC subcarrier 603 is a vacated subcarrier, and the first DC subcarrier 603 does not belong to the PRB whose number is 17. A second DC subcarrier 604 is further configured at the center location of the carrier, and the second DC subcarrier 604 overlaps the first DC subcarrier 603. It can be learned that, a carrier structure shown by the sequence 601 can support access of UE only at the center of the carrier.

The first DC subcarrier 603 in the sequence 601 is shifted to the left by 900 KHz, that is, five PRBs, so as to obtain the sequence 602. In the sequence 602, the second DC subcarrier 604 is still located at the center location on the carrier, that is, on the PRB whose number is 17, and the second DC subcarrier 604 belongs to the PRB whose number is 17. The first DC subcarrier 603 is located at the center of a PRB whose number is 12. In addition, the first DC subcarrier 603 is a vacated subcarrier, and the first DC subcarrier 603 does not belong to the PRB whose number is 12. A spacing between the first DC subcarrier 603 and the second DC subcarrier 604 is five PRBs, that is, 900 KHz. In this way, if 72 subcarriers that use the first DC subcarrier 603 as a center are used as an access bandwidth, the UE may perform access at the PRB whose number is 12, thereby providing a more flexible use method for a carrier bandwidth.

It can be learned from FIG. 6 that, by comparing the sequence 602 with the sequence 601, boundaries of only the PRB whose number is 12 to the PRB whose number is 17 are not aligned, and boundaries of other PRBs are all aligned. In this way, for two cells, if access is performed at different carrier locations, it may be ensured that boundaries of PRBs other than DC subcarriers of access bandwidths of the two cells are as aligned as possible, thereby facilitating cell interference coordination.

If a base station uses the carrier structure sequence shown by the sequence 602 in FIG. 6, on a transmit carrier of the base station, a third DC subcarrier is located at a 0 Hz subcarrier location of a baseband signal corresponding to a receive carrier of the UE. Different UEs may have different receive carrier bandwidths. Specifically, a receive carrier may be an entire transmit carrier of the base station, and in this case, a transmit carrier bandwidth of the base station is equal to a receive carrier bandwidth of the UE; or a receive carrier of UE may be a part of a transmit carrier bandwidth of the base station, and in this case, the transmit carrier bandwidth of the base station is not equal to a receive carrier bandwidth of the UE. Generally, the transmit carrier bandwidth of the base station is higher than the receive carrier bandwidth of the UE. In this way, receive carrier bandwidths of different types of UEs or UEs having different capabilities may be different, and corresponding third DC subcarriers may have different locations.

Figure 7:
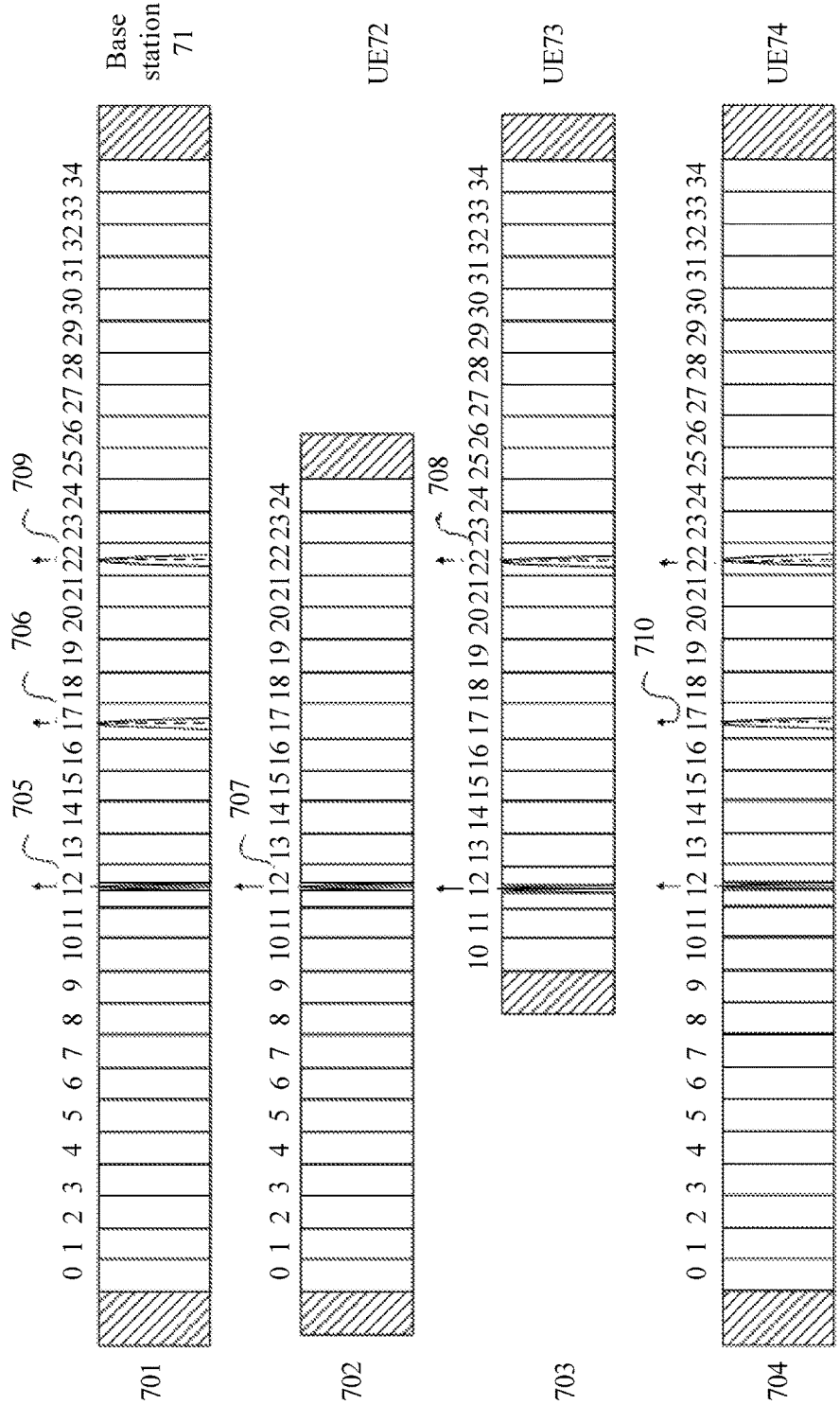
FIG. 7 is a third schematic diagram of a direct current component subcarrier configuration according to an embodiment of the present invention.

FIG. 7 is a third schematic diagram of a direct current component subcarrier configuration according to an embodiment of the present invention. A sequence 701 is a carrier configuration sequence of a base station 71, and the sequence 701 is configured the same as the sequence 602. A carrier bandwidth is 7 MHz and includes 35 PRBs. A first DC subcarrier 705 is located at the center of a PRB whose number is 12, is a vacated subcarrier, and does not belong to the PRB whose number is 12. A second DC subcarrier 706 is located at a PRB whose number is 17, and belongs to the PRB whose number is 17. A spacing between the first DC subcarrier 705 and the second DC subcarrier 706 is five PRBs, that is, 900 KHz. For the base station 71 whose carrier is configured according to the sequence 701, in order that all system bandwidth resources can be used, there are mainly two manners. In a first manner, new UE 74 is developed, so as to support a new non-standard bandwidth, and in this case, a new radio frequency indicator needs to be defined in a standard. Design of supporting, by the UE 74, a filter of a corresponding bandwidth and the like imposes impact on both the standard and UE implementation. In the other manner, at least two types of UE are supported. One type of UE may include earlier-release UE 72 that supports working at 5 MHz of a system bandwidth. The other type of UE is new-release UE 73 that works at the other part of the system bandwidth, such as 5 MHz. There is a resource overlap between the two types of UE. A collision may be avoided in a manner such as scheduling restriction. Certainly, in this case, the UE 74 may also co-exist.

A sequence 702 is a carrier configuration sequence of the UE 72, and the UE 72 is conventional UE in releases R8 to R12, and a bandwidth supported by the UE 72 is 5 MHz. For the UE 72, a third DC subcarrier 707 corresponding to a receive carrier of the UE 72 overlaps the first DC subcarrier 705 corresponding to the transmit carrier of the base station 71, but does not overlap the second DC subcarrier 706 corresponding to the transmit carrier of the base station 71. The third DC subcarrier 707 corresponding to the receive carrier of the UE 72 overlaps the first DC subcarrier 705 corresponding to the transmit carrier of the base station 71, and is corresponding to a vacated subcarrier. Therefore, from the perspective of either the base station 71 or the UE 72, processing may be performed in a pre-defined manner. The base station 71 does not send data on the vacated subcarrier, and the UE 72 does not perform, on the vacated subcarrier, an operation such as data receiving and demodulation or corresponding measurement. In another aspect, the third DC subcarrier 707 corresponding to the UE 72 does not overlap the second DC subcarrier 706 corresponding to the transmit carrier of the base station 71. If the base station 71 uses a non-zero intermediate frequency structure, for the base station 71, interference on the second DC subcarrier 706 on the transmit carrier corresponding to the base station 71 may be ignored, and this means that the UE 72 may normally receive data on this subcarrier. Such a transmit end structure of the base station 71 is extremely important for conventional UE in releases R8 to R12, and the UE can be totally unaffected by an access bandwidth location change. Data transmission may still be performed on the second DC subcarrier 706 corresponding to the transmit carrier of the base station 71, and backward compatibility is well kept. Certainly, because a transmit end of the base station 71 may use a zero intermediate frequency structure, there is interference on the second DC subcarrier 706 on the transmit carrier, and this means that the UE 72 cannot receive data on this subcarrier. For a specific manner in which the base station 71 processes this subcarrier, refer to Table 3.

A sequence 703 is a carrier configuration sequence of the UE 73, and the UE 73 is new-release UE, and a bandwidth supported by the UE 73 is 5 MHz. For the UE 73, a third DC subcarrier 708 corresponding to a receive carrier of the UE 73 is located at a PRB whose number is 22. The third DC subcarrier 708 does not overlap the first DC subcarrier 705 corresponding to the transmit carrier of the base station 71, and does not overlap the second DC subcarrier 706 corresponding to the transmit carrier of the base station 71. To support access of the UE 73, the base station 71 needs to configure, on the transmit carrier, a third DC subcarrier 709 corresponding to the UE 73. Due to a factor that a receive end structure of the UE 73 usually uses the zero intermediate frequency, for the UE 73, the third DC subcarrier 708 corresponding to the receive carrier of the UE 73 is greatly interfered with. Therefore, the UE 73 cannot receive data on the third DC subcarrier 708 corresponding to the receive carrier of the UE 73. The UE 73 needs to process this DC subcarrier according to signaling delivered by the base station 71, or the UE 73 performs, by default, processing according to the DC subcarrier corresponding to the receive carrier of the UE 73, and does not participate in an operation such as data receiving and demodulation or corresponding measurement. The third DC subcarrier 708 corresponding to the UE 73 does not overlap the second DC subcarrier 706 corresponding to the transmit carrier of the base station 71. If the base station 71 uses the non-zero intermediate frequency structure, for the base station 71, interference on the second DC subcarrier 706 on the transmit carrier corresponding to the base station 71 may be ignored. This means that the UE 73 may normally receive data on this subcarrier. Such a transmit end structure of the base station 71 is also extremely important for the UE 73, and data transmission may still be performed on the second DC subcarrier 706 corresponding to the transmit carrier of the base station 71, thereby improving spectral efficiency. Certainly, because the transmit end of the base station 71 may use the zero intermediate frequency structure, there is interference on the second DC subcarrier 706 on the transmit carrier, and this means that the UE 73 cannot receive data on this subcarrier. For a specific manner in which the base station 71 processes this subcarrier, refer to Table 2 or Table 3, and the manner may be specifically notified by using signaling. In addition, configuration of another DC subcarrier may be notified to the UE 73, for example, the location of the first DC subcarrier 705, so that the UE 73 learns a vacated subcarrier location, PRB sorting, and a specific processing manner. If there is further a DC subcarrier that is configured by another UE and that affects data transmission and processing of the UE 73, the DC subcarrier needs to be notified to the UE 73 by using signaling.

A sequence 704 is a carrier configuration sequence of the UE 74, and the UE 74 is new-release UE, and a bandwidth supported by the UE 74 is 7 MHz. A receive carrier bandwidth of the UE 74 is equal to the transmit carrier bandwidth of the base station 71. For the UE 74, a third DC subcarrier 710 corresponding to a receive carrier of the UE 74 is located at a center frequency on the receive carrier, and is the same as a center frequency on the transmit carrier of the base station 71. Further, the third DC subcarrier 710 corresponding to the UE 74 overlaps the second DC subcarrier 706 corresponding to the transmit carrier of the base station. In addition, to support access of the UE 74, the base station 71 needs to configure, on the transmit carrier, a third DC subcarrier corresponding to the UE 74. Due to a factor that a receive end structure of the UE 74 usually uses the zero intermediate frequency, for the UE 74, the third DC subcarrier 710 corresponding to the receive carrier of the UE 74 is greatly interfered with. Therefore, the UE 74 cannot receive data on the third DC subcarrier 710 corresponding to the receive carrier of the UE 74. The UE 74 needs to process this DC subcarrier according to signaling delivered by the base station 71, or the UE 74 performs, by default, processing according to the third DC subcarrier 710 corresponding to the receive carrier of the UE 74, and does not participate in an operation such as data receiving and demodulation or corresponding measurement. In addition, configuration of another DC subcarrier may be notified to the UE 74, for example, the location of the first DC subcarrier 705, so that the UE 74 learns a vacated subcarrier location, PRB sorting, and a specific processing manner. If there is further a DC subcarrier that is configured by another UE and that affects data transmission and processing of such UE, the DC subcarrier needs to be notified to the UE by using signaling. A spacing between the third DC subcarrier 707 and the third DC subcarrier 708 is 10 PRBs, that is, 1800 KHz, which is an integer multiple of 900 KHz. A spacing between the third DC subcarrier 707 and the third DC subcarrier 710 is five PRBs, that is, 900 KHz. A spacing between the third DC subcarrier 708 and the third DC subcarrier 710 is five PRBs, that is, 900 KHz.

Figure 8A:
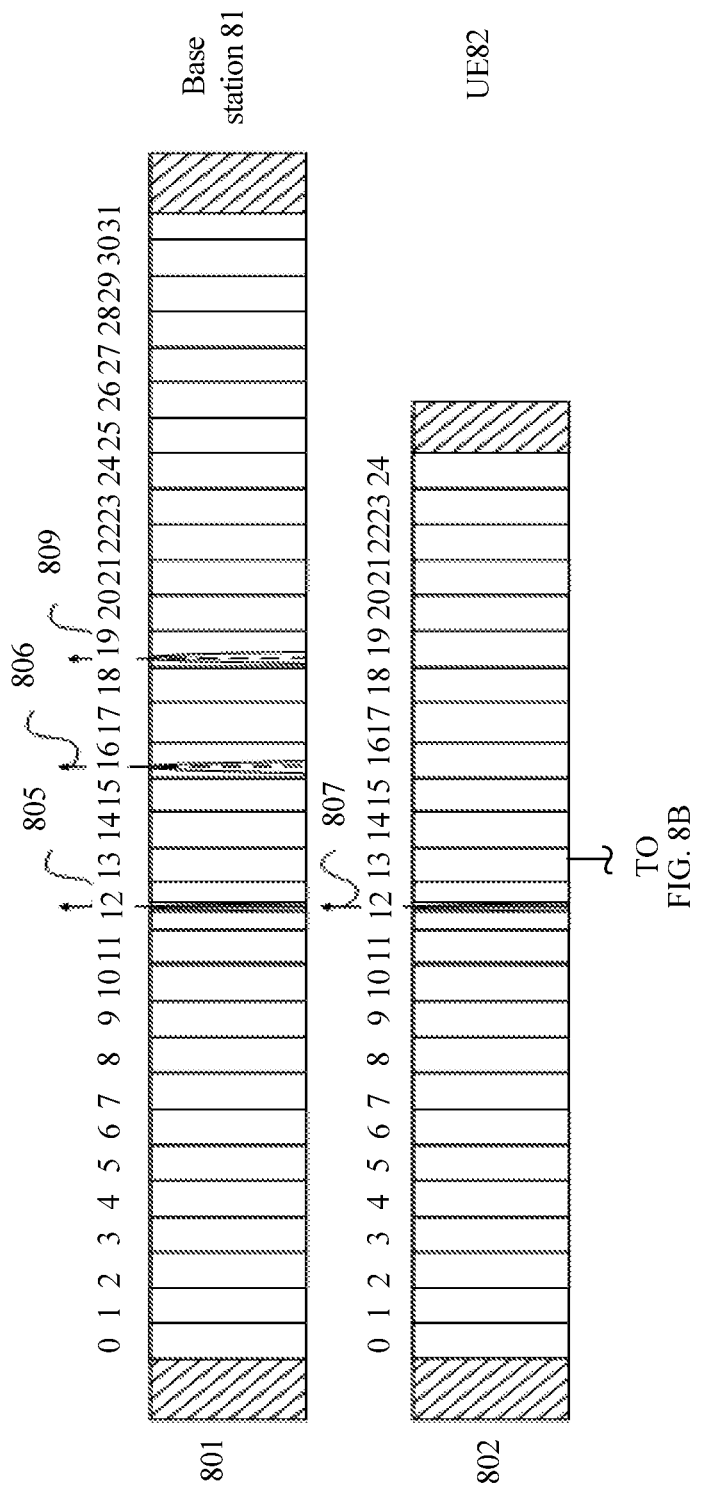
FIG. 8A and FIG. 8B are a fourth schematic diagram of a direct current component subcarrier configuration according to an embodiment of the present invention.
Figure 8B:
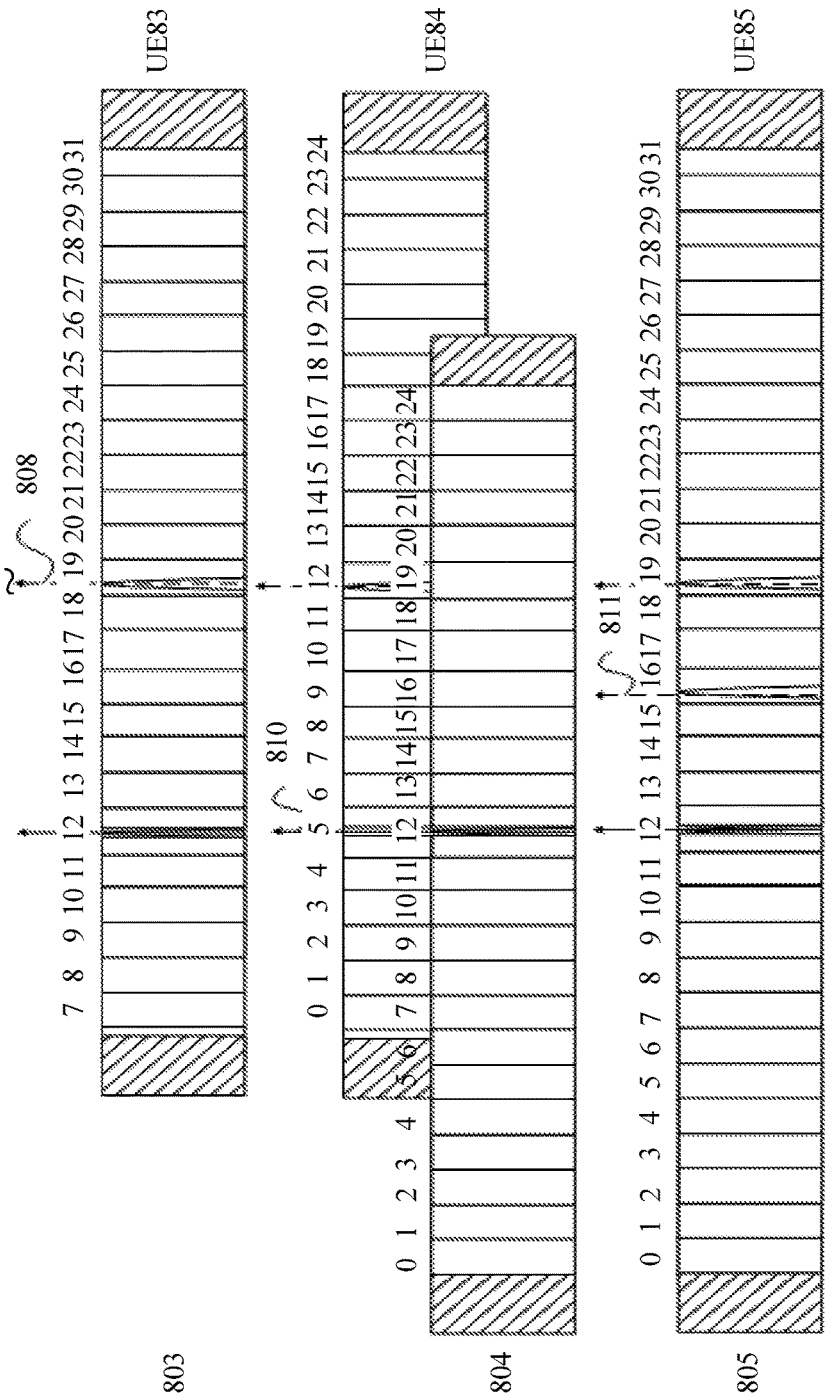

FIG. 8A and FIG. 8B are a fourth schematic diagram of a direct current component subcarrier configuration according to an embodiment of the present invention. A sequence 801 is a carrier configuration sequence of a base station 81. A carrier bandwidth of the sequence 801 is 6.2 MHz, and includes 31.67 PRBs, which are respectively PRBs whose numbers are from 0 to 31. A PRB whose number is 31 is only 0.67 PRB, and includes only eight subcarriers. The eight subcarriers may not be used, or after mutually learning the special PRB, the base station and UE perform transmission corresponding to the eight subcarriers, for example, may transmit data or some reference signals that have special functions and are used for channel or interference measurement or the like. A first DC subcarrier 805 is located at the center of a PRB whose number is 12, is a vacated subcarrier, and does not belong to the PRB whose number is 12. A second DC subcarrier 806 is located at a PRB whose number is 16, and belongs to the PRB whose number is 16. A spacing between the first DC subcarrier 805 and the second DC subcarrier 806 is three PRBs plus six subcarriers plus four subcarriers, that is, 46 subcarriers, and 690 KHz in total, which is an integer multiple of 15 KHz. For the base station 81 whose carrier is configured according to the sequence 801, in order that all system bandwidth resources can be used, there are mainly two manners: In a first manner, new UE 85 is developed, so as to support a new non-standard bandwidth, and a new radio frequency indicator needs to be defined in a standard. Design of supporting, by the UE 85, a filter of a corresponding bandwidth and the like imposes impact on both the standard and UE implementation The UE 85 has a structure similar to that of the base station, and may use an entire carrier bandwidth. In the other manner, at least two types of UE are supported. One type of UE may include earlier-release UE 82 that supports working at 5 MHz of a system bandwidth. The other type of UE is new-release UE 83 that works at the other part of the system bandwidth, such as 5 MHz. There is a resource overlap between the two types of UE. A collision may be avoided in a manner such as scheduling restriction. Certainly, in this case, the UE 85 may also co-exist. Further, if the UE can receive data at the entire system bandwidth to improve a peak rate, a structure of the UE 84 may be used, and two implementation methods are specifically included. In a first method, the UE implements the peak rate improvement in a carrier aggregation (Carrier Aggregation, CA) manner. For example, a 5 MHz carrier that supports working of earlier-release UE is used as a primary component carrier, the other 5 MHz carrier is used as a secondary component carrier, and it can be learned that there is a resource overlap between the primary component carrier and the secondary component carrier. The base station needs to schedule an algorithm by using a scheduler, so as to avoid a collision in resource allocation, and avoid interference. In the other method, the UE performs processing in a CA manner in an aspect such as radio frequency receiving, but baseband signals are finally combined to be equivalent to a 6.2 MHz bandwidth of a single carrier. As a result, processing by the UE is still equivalent to processing on the single carrier, so that overheads of control signaling, such as a PDCCH and uplink A/N, that are brought by the carrier aggregation manner in the first method can be avoided, and costs of maintaining multiple carriers in a system are also reduced. From the perspective of the base station, all PRBs are successively arranged. A PRB corresponding to a biggest PRB number, for example, a PRB 31, may be a special PRB, does not include 12 subcarriers, and is corresponding to eight subcarriers herein. There is a resource overlap between the UE 82 and the UE 83.

A sequence 802 is a carrier configuration sequence of the UE 82, and the UE 82 is conventional UE in releases R8 to R12, and a bandwidth supported by the UE 82 is 5 MHz. For the UE 82, a third DC subcarrier 807 corresponding to a receive carrier of the UE 82 overlaps the first DC subcarrier 805 corresponding to the transmit carrier of the base station 81, but does not overlap the second DC subcarrier 806 corresponding to the transmit carrier of the base station 81. The third DC subcarrier 807 corresponding to the receive carrier of the UE 82 overlaps the first DC subcarrier 805 corresponding to the transmit carrier of the base station 81, and is corresponding to a vacated subcarrier. Therefore, from the perspective of either the base station 81 or the UE 82, processing may be performed in a pre-defined manner. The base station 81 does not send data on the vacated subcarrier, and the UE 82 does not perform, on the vacated subcarrier, an operation such as data receiving and demodulation or corresponding measurement. In another aspect, the third DC subcarrier 807 corresponding to the UE 82 does not overlap the second DC subcarrier 806 corresponding to the transmit carrier of the base station 81. If the base station 81 uses a non-zero intermediate frequency structure, for the base station 81, interference on the second DC subcarrier 806 on the transmit carrier corresponding to the base station 81 may be ignored, and this means that the UE 82 may normally receive data on this subcarrier. Such a transmit end structure of the base station 81 is extremely important for conventional UE in releases R8 to R12, and the UE can be totally unaffected by an access bandwidth location change. Data transmission may still be performed on the second DC subcarrier 806 corresponding to the transmit carrier of the base station 81, and backward compatibility is well kept. Certainly, because a transmit end of the base station 81 may use a zero intermediate frequency structure, there is interference on the second DC subcarrier 806 on the transmit carrier, and this means that the UE 82 cannot receive data on this subcarrier. For a specific manner in which the base station 81 processes this subcarrier, refer to Table 3.

A sequence 803 is a carrier configuration sequence of the UE 83, and the UE 83 is new-release UE, and a bandwidth supported by the UE 83 is 5 MHz. For the UE 83, a third DC subcarrier 808 corresponding to a receive carrier of the UE 83 is located at a PRB whose number is 19. The third DC subcarrier 808 does not overlap the first DC subcarrier 805 corresponding to the transmit carrier of the base station 81, and does not overlap the second DC subcarrier 806 corresponding to the transmit carrier of the base station 81. To support access of the UE 83, the base station 81 needs to configure, on the transmit carrier, a third DC subcarrier 809 corresponding to the UE 83. Due to a factor that a receive end structure of the UE 83 usually uses zero intermediate frequency, for the UE 83, the third DC subcarrier 808 corresponding to the receive carrier of the UE 83 is greatly interfered with. Therefore, the UE 83 cannot receive data on the third DC subcarrier 808 corresponding to the receive carrier of the UE 83. The UE 83 needs to process this DC subcarrier according to signaling delivered by the base station 81, or the UE 83 performs, by default, processing according to the DC subcarrier corresponding to the receive carrier of the UE 83, and does not participate in an operation such as data receiving and demodulation or corresponding measurement. The third DC subcarrier 808 corresponding to the UE 83 does not overlap the second DC subcarrier 806 corresponding to the transmit carrier of the base station 81. If the base station 81 uses the non-zero intermediate frequency structure, for the base station 81, interference on the second DC subcarrier 806 on the transmit carrier corresponding to the base station 81 may be ignored. This means that the UE 83 may normally receive data on this subcarrier. Such a transmit end structure of the base station 81 is also extremely important for the UE 83, and data transmission may still be performed on the second DC subcarrier 806 corresponding to the transmit carrier of the base station 81, thereby improving spectral efficiency. Certainly, because the transmit end of the base station 81 may use the zero intermediate frequency structure, there is interference on the second DC subcarrier 806 on the transmit carrier, and this means that the UE 83 cannot receive data on this subcarrier. For a specific manner in which the base station 81 processes this subcarrier, refer to Table 2 or Table 3, and the manner may be specifically notified by using signaling. In addition, configuration of another DC subcarrier may be notified to the UE 83, for example, the location of the first DC subcarrier 805, so that the UE 83 learns a vacated subcarrier location, PRB sorting, and a specific processing manner. If there is further a DC subcarrier that is configured by another UE and that affects data transmission and processing of the UE 83, the DC subcarrier needs to be notified to the UE 83 by using signaling.

A sequence 804 is a carrier configuration sequence of the UE 84. The UE 84 is new-release UE, and uses a CA manner for implementation. The UE 84 uses, as a primary component carrier, a 5 MHz carrier supporting working of earlier-release UE (such as the UE 83), and uses the other 5 MHz carrier as a secondary component carrier (such as the UE 84). A bandwidth of the UE 84 includes the primary component carrier and the secondary component carrier, and it can be learned from the diagram that there is a resource overlap between the primary component carrier and the secondary component carrier. For the UE 84, a third DC subcarrier 810 corresponding to a receive carrier of the UE 84 is a third DC subcarrier corresponding to the primary component carrier, and overlaps the first DC subcarrier 805 corresponding to the transmit carrier of the base station 81, but does not overlap the second DC subcarrier 806 corresponding to the transmit carrier of the base station 81. The third DC subcarrier 810 corresponding to the receive carrier of the UE 84 overlaps the first DC subcarrier 805 corresponding to the transmit carrier of the base station 81, and is corresponding to a vacated subcarrier. Therefore, from the perspective of either the base station 81 or the UE 84, processing may be performed in a pre-defined manner. The base station 81 does not send data on the vacated subcarrier, and the UE 84 does not perform, on the vacated subcarrier, an operation such as data receiving and demodulation or corresponding measurement. In another aspect, the third DC subcarrier 810 corresponding to the UE 84 does not overlap the second DC subcarrier 806 corresponding to the transmit carrier of the base station 81. If the base station 81 uses the non-zero intermediate frequency structure, for the base station 81, interference on the second DC subcarrier 806 on the transmit carrier corresponding to the base station 81 may be ignored, and this means that the UE 84 may normally receive data on this subcarrier. Certainly, because the transmit end of the base station 81 may use the zero intermediate frequency structure, there is interference on the second DC subcarrier 806 on the transmit carrier, and this means that the UE 84 cannot receive data on this subcarrier. For a specific manner in which the base station 81 processes this subcarrier, refer to Table 3.

A sequence 805 is a carrier configuration sequence of the UE 85, and the UE 85 is new-release UE, and a bandwidth supported by the UE 85 is 6.2 MHz. A receive carrier bandwidth of the UE 85 is equal to the transmit carrier bandwidth of the base station 81. For the UE 85, a third DC subcarrier 811 corresponding to a receive carrier of the UE 85 is located at a center frequency on the receive carrier, and is the same as a center frequency on the transmit carrier of the base station 81. Further, the third DC subcarrier 811 corresponding to the UE 85 overlaps the second DC subcarrier 806 corresponding to the transmit carrier of the base station. In addition, to support access of the UE 85, the base station 81 needs to configure, on the transmit carrier, a third DC subcarrier corresponding to the UE 85. Due to a factor that a receive end structure of the UE 85 usually uses the zero intermediate frequency, for the UE 85, the third DC subcarrier 811 corresponding to the receive carrier of the UE 85 is greatly interfered with. Therefore, the UE 85 cannot receive data on the third DC subcarrier 811 corresponding to the receive carrier of the UE 85. The UE 85 needs to process this DC subcarrier according to signaling delivered by the base station 81, or the UE 85 performs, by default, processing according to the third DC subcarrier 811 corresponding to the receive carrier of the UE 85, and does not participate in an operation such as data receiving and demodulation or corresponding measurement. In addition, configuration of another DC subcarrier may be notified to the UE 85, for example, the location of the first DC subcarrier 805, so that the UE 85 learns a vacated subcarrier location, PRB sorting, and a specific processing manner. If there is further a DC subcarrier that is configured by another UE and that affects data transmission and processing of such UE, the DC subcarrier needs to be notified to the UE by using signaling. A spacing between the third DC subcarrier 807 and the third DC subcarrier 808 is 1200 KHz, which is an integer multiple of 300 KHz. Each of a spacing between the third DC subcarrier 807 and the third DC subcarrier 811, and a spacing between the third DC subcarrier 810 and the third DC subcarrier 811 is 1200 KHz, which is an integer multiple of 300 KHz. A spacing between any two of the third DC subcarrier 808, the third DC subcarrier 811, and the third DC subcarrier 810 is 1200 KHz, which is an integer multiple of 300 KHz.

Further, in the direct current component subcarrier configuration methods provided in the embodiments shown in FIG. 3 and FIG. 4, the methods further include: sending, by the base station, first signaling to UE, where the first signaling is used to explicitly or implicitly indicate location information of the first DC subcarrier. That is, after determining the location of the first DC subcarrier, the base station needs to send the first signaling to the UE, so as to notify the UE of the location information of the first DC subcarrier. In this way, after receiving the first signaling, the UE may determine the location of the first DC subcarrier. Because the first DC subcarrier is a vacated subcarrier and does not belong to any PRB, the UE that receives the first signaling may determine not to receive or demodulate data at the location of the first DC subcarrier. The first signaling is explicit or implicit signaling. If the first signaling is explicit signaling, the first signaling is radio resource control (Radio Resource Control, RRC) dedicated signaling; or if the first signaling is implicit signaling, the first signaling may be obtained by the UE by performing blind detection on a synchronization channel location. For example, the base station transmits a synchronization channel and/or a broadcast channel on the 72 subcarriers that use the first DC subcarrier as a center, and mapping and transmission methods for the synchronization channel and/or the broadcast channel are the same as those in the LTE system. The UE may perform access according to an access manner in an original LTE system and use this carrier, and a central subcarrier of the access bandwidth may be considered as the first DC subcarrier.

Further, in the direct current component subcarrier configuration methods provided in the embodiments shown in FIG. 3 and FIG. 4, the methods further include: sending, by the base station, second signaling to the UE, where the second signaling includes location information of the second DC subcarrier and information about whether the second DC subcarrier carries a signal, and the second signaling is RRC dedicated signaling or RRC broadcast signaling. That is, after determining the location of the second DC subcarrier, the base station needs to send the second signaling to the UE, so as to notify the UE of the location information of the second DC subcarrier. In this way, after receiving the second signaling, the UE may determine the location of the second DC subcarrier and the information about whether the second DC subcarrier carries a signal. Because the second DC subcarrier is located at the 0 Hz subcarrier location of the baseband signal corresponding to the transmit carrier of the base station, the UE that receives the second signaling may determine whether to receive or demodulate data on the second DC subcarrier and a specific method for receiving or demodulating data on the second DC subcarrier. The information about whether the second DC subcarrier carries a signal includes information about whether the second DC subcarrier carries a wanted reference signal, control channel, or data signal. The second signaling is RRC dedicated signaling. If the sent second signaling notifies the UE of information that the second DC subcarrier on the carrier does not carry a wanted signal, the UE does not perform demodulation on the second DC subcarrier, but performs rate matching processing on a control channel and a data channel, or punctures and does not receive a control channel and a data channel. If the sent second signaling notifies the UE that the second DC subcarrier on the carrier carries a wanted reference signal, control channel, or data signal, the UE performs demodulation on the second DC subcarrier, and performs receiving processing on a control channel and a data channel. Because the second DC subcarrier is located at the 0 Hz subcarrier location of the baseband signal corresponding to the transmit carrier of the base station, processing manners for all UEs that can observe the subcarrier may be the same. In this way, the second signaling may be RRC broadcast signaling, and may be notified to the UE by using an SIB message or the like, thereby reducing signaling overheads.

Further, in the direct current component subcarrier configuration methods provided in the embodiments shown in FIG. 3 and FIG. 4, the methods further include: sending, by the base station, third signaling to the UE, where the third signaling includes location information of the at least one third DC subcarrier, and the third signaling is RRC dedicated signaling. That is, after determining the location of the at least one third DC subcarrier, the base station needs to send the third signaling to the UE, so as to notify the UE of the location information of the third DC subcarrier. In this way, after receiving the third signaling, the UE may determine a location of each third DC subcarrier. Further, the base station may notify the UE of information about whether the base station transmits a signal on the third DC subcarrier. If the third DC subcarrier is located at the 0 Hz subcarrier location of the baseband signal corresponding to the receive carrier of the UE, generally, there is interference on the subcarrier. In this case, the UE may process the subcarrier without depending on the third signaling, that is, the UE discards the subcarrier, and does not perform data receiving or demodulation. If the third DC subcarrier has a location different from the 0 Hz subcarrier location of the baseband signal corresponding to the receive carrier of the UE, that is, the third DC subcarrier and a DC subcarrier on the receive carrier of the UE are not a same carrier, and locations of the two subcarriers do not overlap, the UE may determine, according to the third signaling, the information that the base station transmits a signal on the third DC subcarrier, so that the UE determines whether to perform data receiving or demodulation on the third DC subcarrier, and a specific method for performing data receiving or demodulation on the third DC subcarrier. The information about whether the third DC subcarrier carries a signal includes information about whether the third DC subcarrier carries a wanted reference signal, control channel, or data signal. The third DC subcarrier is RRC dedicated signaling.

Further, in the direct current component subcarrier configuration methods provided in the embodiments shown in FIG. 3 and FIG. 4, the methods further include: determining, by the base station, a fourth DC subcarrier on the carrier, where the fourth DC subcarrier is corresponding, in the frequency domain, to a center frequency location on a carrier that is sent by the UE and that is received by the base station; and determining, by the base station, a fifth DC subcarrier on the carrier, where the fifth DC subcarrier is located, in the frequency domain, at a center frequency location at which the base station receives the carrier sent by the UE.

Specifically, similar to a method for determining a direct current component subcarrier on the base station side, for new-release UE, a new DC subcarrier location may also be defined. Therefore, the methods provided in the embodiments shown in FIG. 3 and FIG. 4 further include the following: The base station determines the fourth DC subcarrier on the carrier, where the fourth DC subcarrier is corresponding, in the frequency domain, to the center frequency location on the carrier that is sent by the UE and that is received by the base station. A transmit carrier of each UE has a corresponding center frequency. After determining the fourth DC subcarrier on the carrier, the base station may determine whether to receive, at the location corresponding to the fourth DC subcarrier, uplink data sent by the UE. The base station determines the fifth DC subcarrier on the carrier, where the fifth DC subcarrier is located, in the frequency domain, at the center frequency location at which the base station receives the carrier sent by the UE. Because a receive carrier bandwidth of the base station may be different from a transmit carrier bandwidth of the UE, the fifth DC subcarrier is located, in the frequency domain, at the center frequency location at which the base station receives the carrier sent by the UE. After determining the fifth DC subcarrier on the carrier, the base station may determine whether to receive, at the location corresponding to the fifth DC subcarrier, uplink data sent by the UE.

Figure 9:
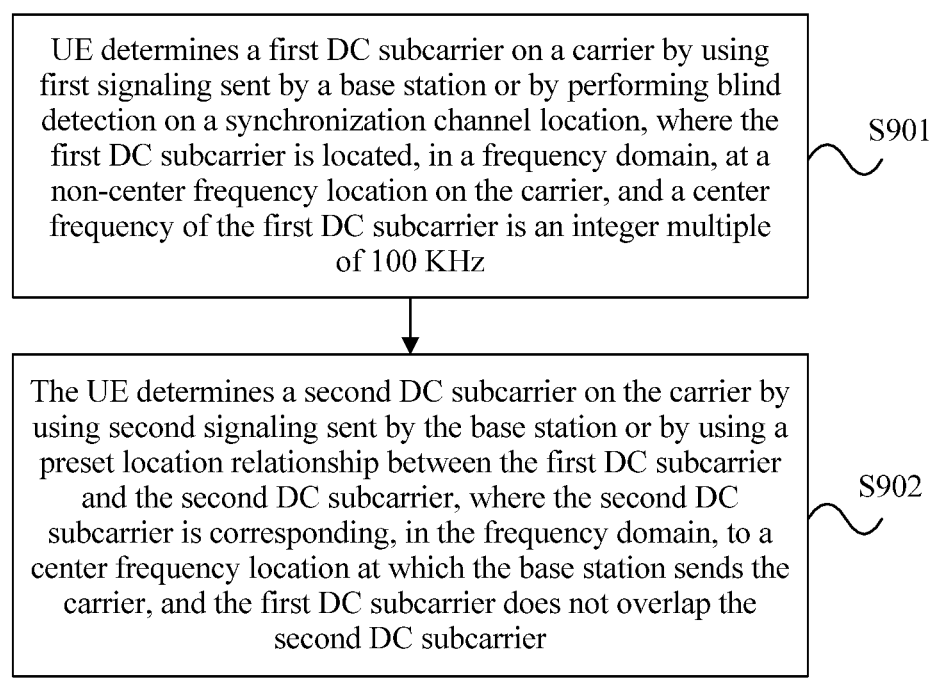
FIG. 9 is a flowchart of Embodiment 3 of a direct current component subcarrier configuration method according to an embodiment of the present invention.

FIG. 9 is a flowchart of Embodiment 3 of a direct current component subcarrier configuration method according to an embodiment of the present invention. As shown in FIG. 9, the method in this embodiment includes the following steps.

Step S901: UE determines a first DC subcarrier on a carrier by using first signaling sent by a base station or by performing blind detection on a synchronization channel location, where the first DC subcarrier is located, in a frequency domain, at a non-center frequency location on the carrier, and a center frequency of the first DC subcarrier is an integer multiple of 100 KHz.

Step S902: The UE determines a second DC subcarrier on the carrier by using second signaling sent by the base station or by using a preset location relationship between the first DC subcarrier and the second DC subcarrier, where the second DC subcarrier is corresponding, in the frequency domain, to a center frequency location at which the base station sends the carrier, and the first DC subcarrier does not overlap the second DC subcarrier.

There is no sequence of performing step S901 and step S902. Generally, step S901 and step S902 are simultaneously performed.

According to the direct current component subcarrier configuration method provided in this embodiment of the present invention, a first DC subcarrier and a second DC subcarrier are determined, where the first DC subcarrier is located, in a frequency domain, at a non-center frequency location on a carrier, a center frequency of the first DC subcarrier is an integer multiple of 100 KHz, the second DC subcarrier is located, in the frequency domain, at a center frequency location at which a base station transmits the carrier, so that UE can perform access at two possible candidate locations. The base station may select a location according to interference statuses detected at the different locations, or may randomly select a location, so that different base stations can send common control channels such as PSSs, SSSs, and PBCHs at the two different locations, thereby reducing a collision between transmission locations of common control channels of all cells, and reducing interference between the common control channels of all the cells.

Further, in the embodiment shown in FIG. 9, a spacing between the first DC subcarrier and the second DC subcarrier in the frequency domain is an integer multiple of a frequency bandwidth of a subcarrier.

Further, in the embodiment shown in FIG. 9, the spacing between the first DC subcarrier and the second DC subcarrier in the frequency domain is a least common multiple of 100 KHz and an integer multiple of the frequency bandwidth of a subcarrier.

Further, in the embodiment shown in FIG. 9, the spacing between the first DC subcarrier and the second DC subcarrier in the frequency domain is a least common multiple of an integer multiple of the frequency bandwidth of a subcarrier, 100 KHz, and a frequency bandwidth of one PRB.

Further, in the embodiment shown in FIG. 9, the first DC subcarrier does not belong to any PRB on the carrier, and the second DC subcarrier belongs to a PRB on the carrier.

Further, in the embodiment shown in FIG. 9, the first DC subcarrier is located on a central subcarrier of an access bandwidth of the carrier, the access bandwidth is used to send at least a synchronization channel and a PBCH, and the synchronization channel includes a PSS and an SSS.

Figure 10:
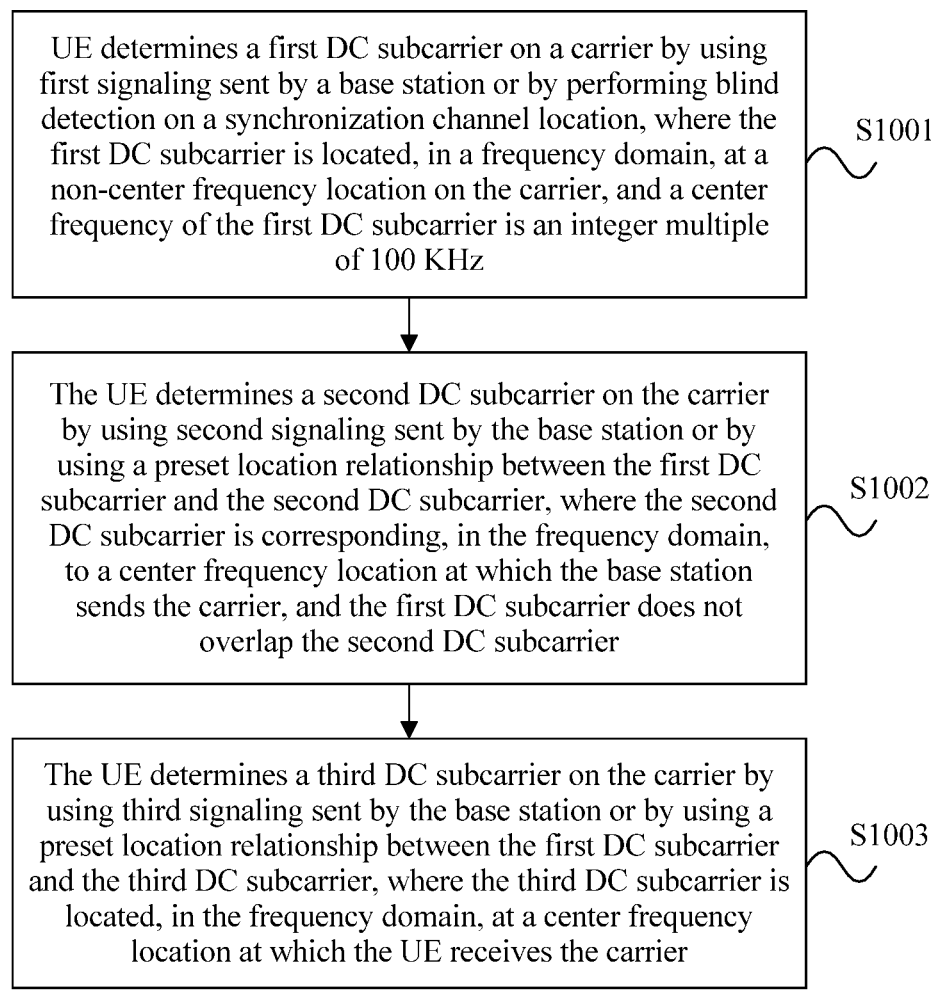
FIG. 10 is a flowchart of Embodiment 4 of a direct current component subcarrier configuration method according to an embodiment of the present invention.

FIG. 10 is a flowchart of Embodiment 4 of a direct current component subcarrier configuration method according to an embodiment of the present invention. As shown in FIG. 10, the method in this embodiment includes the following steps.

Step S1001: UE determines a first DC subcarrier on a carrier by using first signaling sent by a base station or by performing blind detection on a synchronization channel location, where the first DC subcarrier is located, in a frequency domain, at a non-center frequency location on the carrier, and a center frequency of the first DC subcarrier is an integer multiple of 100 KHz.

Step S1002: The UE determines a second DC subcarrier on the carrier by using second signaling sent by the base station or by using a preset location relationship between the first DC subcarrier and the second DC subcarrier, where the second DC subcarrier is corresponding, in the frequency domain, to a center frequency location at which the base station sends the carrier, and the first DC subcarrier does not overlap the second DC subcarrier.

Step S1003: The UE determines a third DC subcarrier on the carrier by using third signaling sent by the base station or by using a preset location relationship between the first DC subcarrier and the third DC subcarrier, where the third DC subcarrier is located, in the frequency domain, at a center frequency location at which the UE receives the carrier.

Further, in the embodiment shown in FIG. 10, a center frequency of the third DC subcarrier is an integer multiple of 100 KHz.

Further, in the embodiment shown in FIG. 10, if the third DC subcarrier overlaps the first DC subcarrier, the third DC subcarrier does not belong to any PRB on the carrier; or if the third DC subcarrier does not overlap the first DC subcarrier, the third DC subcarrier belongs to a PRB on the carrier.

Further, in the embodiment shown in FIG. 10, if the third DC subcarrier does not overlap the first DC subcarrier, a spacing between the first DC subcarrier and the third DC subcarrier in the frequency domain is a least common multiple of 100 KHz and an integer multiple of a frequency bandwidth of a subcarrier.

Further, in the embodiment shown in FIG. 10, if the third DC subcarrier does not overlap the first DC subcarrier, the spacing between the first DC subcarrier and the third DC subcarrier in the frequency domain is a least common multiple of an integer multiple of the frequency bandwidth of a subcarrier, 100 KHz, and a frequency bandwidth of one PRB.

Further, in the embodiment shown in FIG. 10, if the second DC subcarrier does not overlap the third DC subcarrier, the UE receives, on the second DC subcarrier, at least one of the following signals: a reference signal, a control channel, or a data signal.

Further, in the embodiment shown in FIG. 9 or FIG. 10, before the UE determines the first DC subcarrier on the carrier, the method further includes: receiving, by the UE, the first signaling sent by the base station, where the first signaling is used to explicitly or implicitly indicate location information of the first DC subcarrier.

Further, in the embodiment shown in FIG. 9 or FIG. 10, if the first signaling is explicit signaling, the first signaling is RRC dedicated signaling; or if the first signaling is implicit signaling, the UE obtains the first signaling by performing blind detection on the synchronization channel location.

Further, in the embodiment shown in FIG. 9 or FIG. 10, before the UE determines the second DC subcarrier on the carrier, the method further includes: receiving, by the UE, the second signaling sent by the base station, where the second signaling includes location information of the second DC subcarrier and information about whether the second DC subcarrier carries a signal, and the second signaling is RRC dedicated signaling.

Further, in the embodiment shown in FIG. 9 or FIG. 10, before the UE determines the third DC subcarrier on the carrier, the method further includes: receiving, by the UE, the third signaling sent by the base station, where the third signaling includes location information of the at least one third DC subcarrier and information about whether each third DC subcarrier carries a signal, and the third signaling is RRC dedicated signaling.

Further, in the embodiment shown in FIG. 9 or FIG. 10, the method further includes: determining, by the UE, a fourth DC subcarrier on the carrier by using fourth signaling sent by the base station, where the fourth DC subcarrier is located, in the frequency domain, at a center frequency location on a carrier sent by the UE; and determining, by the UE, a fifth DC subcarrier on the carrier by using fifth signaling sent by the base station, where the fifth DC subcarrier is corresponding, in the frequency domain, to a center frequency location at which the base station receives the carrier sent by the UE.

Further, in the embodiment shown in FIG. 9 or FIG. 10, before the UE determines the fourth DC subcarrier on the carrier, the method further includes: receiving, by the UE, the fourth signaling sent by the base station, where the fourth signaling includes location information of the fourth DC subcarrier and information about whether the fourth DC subcarrier carries a signal. Before the UE determines the fifth DC subcarrier on the carrier, the method further includes: receiving, by the UE, the fifth signaling sent by the base station, where the fifth signaling includes location information of the fifth DC subcarrier and information about whether the fifth DC subcarrier carries a signal.

It should be noted that, the direct current component subcarrier configuration methods provided in the embodiments shown in FIG. 9 and FIG. 10 are processed on a UE side. A configuration and processing method, on the UE side, for the first DC subcarrier, the second DC subcarrier, and the third DC subcarrier is the same as or similar to that performed by the base station provided in an embodiment of the present invention, and details are not described herein again.

It should be noted that, a sending module 12 in an embodiment of the present invention may be corresponding to a transmitter of a base station, or may be corresponding to a transceiver of the base station. A processing module 11 may be corresponding to a processor of the base station. The processor herein may be a central processing unit (CPU), or an application specific integrated circuit (ASIC), or one or more integrated circuits for completing implementation of this embodiment of the present invention. The base station may further include a memory. The memory is configured to store instruction code. The processor invokes the instruction code in the memory, so as to control the processing module 11 and the sending module 12 in this embodiment of the present invention to execute the foregoing operation.

A receiving module 22 in an embodiment of the present invention may be corresponding to a receiver of user equipment, or may be corresponding to a transceiver of the user equipment. A processing module 21 may be corresponding to a processor of the user equipment. The processor herein may be a CPU, or an ASIC, or one or more integrated circuits for completing implementation of this embodiment of the present invention. The user equipment may further include a memory. The memory is configured to store instruction code. The processor invokes the instruction code in the memory, so as to control the receiving module 22 and the processing module 21 in this embodiment of the present invention to execute the foregoing operation.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present invention shall be subject to the protection scope of the claims.

What is claimed is:

1. A base station, comprising:
a processor; and
a non-transitory computer-readable storage medium storing a program to be executed by the processor, the program including instructions for:
determining a first direct current (DC) subcarrier on a carrier, wherein the first DC subcarrier is located, in a frequency domain, at a non-center frequency location on the carrier, wherein a center frequency of the first DC subcarrier is an integer multiple of 100 KHz, and wherein the first DC subcarrier is located at a central subcarrier of an access bandwidth of the carrier, the access bandwidth comprising a synchronization channel and a physical broadcast channel (PBCH), and the synchronization channel comprising a primary synchronization signal (PSS) and a secondary synchronization signal (SSS);
determining a second DC subcarrier on the carrier, wherein the second DC subcarrier is located, in the frequency domain, at a center frequency location on the carrier, and wherein the first DC subcarrier does not overlap the second DC subcarrier; and
transmitting the carrier comprising the first DC subcarrier, the second DC subcarrier, and the access bandwidth, causing a user equipment (UE) to access the carrier at the non-center frequency location on the carrier, according to the access bandwidth.

2. The base station according to claim 1, wherein a spacing between the first DC subcarrier and the second DC subcarrier in the frequency domain is an integer multiple of a frequency bandwidth of a subcarrier.

3. The base station according to claim 1, wherein a spacing between the first DC subcarrier and the second DC subcarrier in the frequency domain is a least common multiple of 100 KHz and an integer multiple of a frequency spacing of a subcarrier.

4. The base station according to claim 1, wherein the program further includes instructions for:
determining one or more third DC subcarriers on the carrier, wherein each third DC subcarrier of the one or more third DC subcarriers corresponds, in the frequency domain, to a center frequency location at which at least one UE receives the carrier, and wherein a center frequency of each third DC subcarrier of the one or more third DC subcarriers is an integer multiple of 100 KHz.

5. The base station according to claim 1, wherein a spacing between the first DC subcarrier and the second DC subcarrier in the frequency domain is a least common multiple of an integer multiple of a first frequency spacing of a subcarrier, wo KHz, and a second frequency spacing of one physical resource block (PRB).

6. The base station according to claim 1, wherein the program further includes instructions for:
sending data on the second DC subcarrier corresponding to a transmit carrier of the base station.

7. An user equipment, comprising:
a processor; and
a non-transitory computer-readable storage medium storing a program to be executed by the processor, the program including instructions for:
determining a first direct current (DC) subcarrier on a carrier using first signaling sent by a base station or by performing blind detection on a synchronization channel location, wherein the first DC subcarrier is located, in a frequency domain, at a non-center frequency location on the carrier, wherein a center frequency of the first DC subcarrier is an integer multiple of 100 KHz, and wherein the first DC subcarrier is located at a central subcarrier of an access bandwidth of the carrier, the access bandwidth comprising a synchronization channel and a physical broadcast channel (PBCH), and the synchronization channel comprising a primary synchronization signal (PSS) and a secondary synchronization signal (SSS);
determining a second DC subcarrier on the carrier using second signaling sent by the base station or by using a preset location relationship between the first DC subcarrier and the second DC subcarrier, wherein the second DC subcarrier corresponds, in the frequency domain, to a center frequency location at which the base station sends the carrier, and wherein the first DC subcarrier does not overlap the second DC subcarrier; and
accessing the carrier at the non-center frequency location on the carrier, according to the access bandwidth.

8. The user equipment according to claim 7, wherein the preset location relationship between the first DC subcarrier and the second DC subcarrier comprises a spacing between the first DC subcarrier and the second DC subcarrier in the frequency domain being an integer multiple of a frequency bandwidth of a subcarrier.

9. The user equipment according to claim 7, wherein the preset location relationship between the first DC subcarrier and the second DC subcarrier comprises a spacing between the first DC subcarrier and the second DC subcarrier in the frequency domain being a least common multiple of 100 KHz and an integer multiple of a frequency bandwidth of a subcarrier.

10. The user equipment according to claim 7, wherein the program further includes instructions for:
determining a third DC subcarrier on the carrier using third signaling sent by the base station or by using a preset location relationship between the first DC subcarrier and the third DC subcarrier, wherein the third DC subcarrier is located, in the frequency domain, at a center frequency location at which a user equipment (UE) receives the carrier, and wherein a center frequency of the third DC subcarrier is an integer multiple of 100 KHz.

11. The user equipment according to claim 7, wherein the preset location relationship between the first DC subcarrier and the second DC subcarrier comprises a spacing between the first DC subcarrier and the second DC subcarrier in the frequency domain being a least common multiple of an integer multiple of a first frequency bandwidth of a subcarrier, 100 KHz, and a second frequency bandwidth of one physical resource block (PRB).

12. The user equipment according to claim 7, wherein the program further includes instructions for:
receiving, from the base station, data on the second DC subcarrier.

13. A method, comprising:
determining, by a base station, a first direct current (DC) subcarrier on a carrier, wherein the first DC subcarrier is located, in a frequency domain, at a non-center frequency location on the carrier, wherein a center frequency of the first DC subcarrier is an integer multiple of 100 KHz, and wherein the first DC subcarrier is located at a central subcarrier of an access bandwidth of the carrier, the access bandwidth comprising a synchronization channel and a physical broadcast channel (PBCH), and the synchronization channel comprising a primary synchronization signal (PSS) and a secondary synchronization signal (SSS);

determining, by the base station, a second DC subcarrier on the carrier, wherein the second DC subcarrier is located, in the frequency domain, at a center frequency location at which the base station transmits the carrier, and wherein the first DC subcarrier does not overlap the second DC subcarrier; and transmitting, by the base station, the carrier comprising the first DC subcarrier, the second DC subcarrier, and the access bandwidth, causing a user equipment (UE) to access the carrier at the non-center frequency location on the carrier, according to the access bandwidth.

14. The method according to claim 13, wherein a spacing between the first DC subcarrier and the second DC subcarrier in the frequency domain is an integer multiple of a frequency bandwidth of a subcarrier.

15. The method according to claim 13, wherein:
a spacing between the first DC subcarrier and the second DC subcarrier in the frequency domain is a first least common multiple of 100 KHz and a first integer multiple of a frequency bandwidth of a subcarrier; or
the spacing between the first DC subcarrier and the second DC subcarrier in the frequency domain is a second least common multiple of a second integer multiple of the frequency bandwidth of the subcarrier, 100 KHz, and a frequency bandwidth of one physical resource block (PRB).

16. The method according to claim 13, further comprising:
determining, by the base station, a third DC subcarrier on the carrier, wherein the third DC subcarrier corresponds, in the frequency domain, to a center frequency location at which at least one UE receives the carrier, and wherein a center frequency of the third DC subcarrier is an integer multiple of 100 KHz.

17. A method, comprising:
determining, by user equipment (UE), a first direct current (DC) subcarrier on a carrier using first signaling sent by a base station or by performing blind detection on a synchronization channel location, wherein the first DC subcarrier is located, in a frequency domain, at a non-center frequency location on the carrier, wherein a center frequency of the first DC subcarrier is an integer multiple of 100 KHz, and wherein the first DC subcarrier is located at a central subcarrier of an access bandwidth of the carrier, the access bandwidth comprising a synchronization channel and a physical broadcast channel (PBCH), and the synchronization channel comprising a primary synchronization signal (PSS) and a secondary synchronization signal (SSS);

determining, by the UE, a second DC subcarrier on the carrier using second signaling sent by the base station or by using a preset location relationship between the first DC subcarrier and the second DC subcarrier, wherein the second DC subcarrier corresponds, in the frequency domain, to a center frequency location at which the base station sends the carrier, and wherein the first DC subcarrier does not overlap the second DC subcarrier; and accessing, by the UE, the carrier at the non-center frequency location on the carrier, according to the access bandwidth.

18. The method according to claim 17, wherein the preset location relationship between the first DC subcarrier and the second DC subcarrier comprises a spacing between the first DC subcarrier and the second DC subcarrier in the frequency domain being an integer multiple of a frequency bandwidth of a subcarrier.

19. The method according to claim 17, wherein the preset location relationship between the first DC subcarrier and the second DC subcarrier comprises:
a spacing between the first DC subcarrier and the second DC subcarrier in the frequency domain being a first least common multiple of 100 KHz and a first integer multiple of a frequency bandwidth of a subcarrier; or
the spacing between the first DC subcarrier and the second DC subcarrier in the frequency domain being a second least common multiple of a second integer multiple of the frequency bandwidth of the subcarrier, 100 KHz, and a frequency bandwidth of one physical resource block (PRB).

20. The method according to claim 17, further comprising:
determining, by the UE, a third DC subcarrier on the carrier using third signaling sent by the base station or by using a preset location relationship between the first DC subcarrier and the third DC subcarrier, wherein the third DC subcarrier is located, in the frequency domain, at a center frequency location at which the UE receives the carrier, and wherein a center frequency of the third DC subcarrier is an integer multiple of wo KHz.

* * * * *

UNITED STATES PATENT AND TRADEMARK OFFICE
CERTIFICATE OF CORRECTION

PATENT NO. : 10,306,638 B2  
APPLICATION NO. : 15/588184  
DATED : May 28, 2019  
INVENTOR(S) : Lixia Xue Page 1 of 1

It is certified that error appears in the above-identified patent and that said Letters Patent is hereby corrected as shown below:

In the Claims

In Column 57, Line 52, Claim 5, delete "wo KHz" and insert --100 KHz--.

In Column 60, Line 47, Claim 20, delete "wo KHz" and insert --100 KHz--.

Signed and Sealed this  
Sixteenth Day of July, 2019

Andrei Iancu  
*Director of the United States Patent and Trademark Office*